US011577388B2

(12) United States Patent
Gonzalez Aguirre et al.

(10) Patent No.: US 11,577,388 B2
(45) Date of Patent: Feb. 14, 2023

(54) AUTOMATIC ROBOT PERCEPTION PROGRAMMING BY IMITATION LEARNING

(71) Applicant: Intel Corporation, Santa Clara, CA (US)

(72) Inventors: David I. Gonzalez Aguirre, Hillsboro, OR (US); Javier Felip Leon, Hillsboro, OR (US); Javier Sebastián Turek, Beaverton, OR (US); Luis Carlos Maria Remis, Hillsboro, OR (US); Ignacio Javier Alvarez, Portland, OR (US); Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 16/455,190

(22) Filed: Jun. 27, 2019

(65) Prior Publication Data
US 2019/0314984 A1  Oct. 17, 2019

(51) Int. Cl.
*B25J 9/16* (2006.01)

(52) U.S. Cl.
CPC ............. *B25J 9/163* (2013.01); *B25J 9/1661* (2013.01); *B25J 9/1664* (2013.01)

(58) Field of Classification Search
CPC ............ B25J 9/16; B25J 9/163; B25J 9/1664; B25J 9/1661; B25J 9/161; B25J 9/1628;
(Continued)

(56) References Cited

U.S. PATENT DOCUMENTS

| 2019/0228495 A1* | 7/2019 | Tremblay | ................. B25J 9/161 |
| 2021/0034959 A1* | 2/2021 | Wood | .................... G06K 9/6228 |

OTHER PUBLICATIONS

Peter Kaiser, Extracting Whole-Body Affordances from Multimodal Exploration, 2014, IEEE (Year: 2014).*
(Continued)

*Primary Examiner* — Khoi H Tran
*Assistant Examiner* — Sarah A Tran
(74) *Attorney, Agent, or Firm* — Hanley, Flight and Zimmerman, LLC

(57) ABSTRACT

Apparatus, systems, methods, and articles of manufacture for automatic robot perception programming by imitation learning are disclosed. An example apparatus includes a percept mapper to identify a first percept and a second percept from data gathered from a demonstration of a task and an entropy encoder to calculate a first saliency of the first percept and a second saliency of the second percept. The example apparatus also includes a trajectory mapper to map a trajectory based on the first percept and the second percept, the first percept skewed based on the first saliency, the second percept skewed based on the second saliency. In addition, the example apparatus includes a probabilistic encoder to determine a plurality of variations of the trajectory and create a collection of trajectories including the trajectory and the variations of the trajectory. The example apparatus also includes an assemble network to imitate an action based on a first simulated signal from a first neural network of a first modality and a second simulated signal from a second neural network of a second modality, the action representative of a perceptual skill.

29 Claims, 9 Drawing Sheets

(58) Field of Classification Search
CPC .............. B25J 9/1656; B25J 9/1602; G05B 2219/37521; G05B 2219/40532; G05B 2219/39298; G05B 2219/39037; G05B 2219/40033; G05B 2219/40116; G05B 2219/39546
USPC ........................................................ 700/253
See application file for complete search history.

(56) References Cited

OTHER PUBLICATIONS

Calinon, S.Guenter, F. Billard, A., "On Learning, Representing, and Generalizing a Task in a Humanoid Robot," 2007, IEEE Trans. Syst. Man Cybern. Part B (Cybern.), 12 pages.

Schaal S. (2006) Dynamic Movement Primitives—A Framework for Motor Control in Humans and Humanoid Robotics. In: Kimura H., Tsuchiya K., Ishiguro A., Witte H. (eds) Adaptive Motion of Animals and Machines. Springer, Tokyo, 10 pages.

S. Wieland, D. Gonzalez-Aguirre, N. Vahrenkamp, T. Asfour and R. Dillmann, "Combining force and visual feedback for physical interaction tasks in humanoid robots," 2009, 9th IEEE-RAS International Conference on Humanoid Robots, Paris, 9 pages.

L. Manfredi et al., "Implementation of a neurophysiological model of saccadic eye movements on an anthropomorphic robotic head," 2006, 6th IEEE-RAS International Conference on Humanoid Robots, Genova, 3 pages. (Abstract only provided).

D. Song, C. H. Ek, K. Huebner and D. Kragic, "Task-Based Robot Grasp Planning Using Probabilistic Inference," 2015, pp. 546-561, vol. 31, No. 3, in IEEE Transactions on Robotics.

Digital Image Processing, 4th Edition, Rafael C. Gonzalez, University of Tennessee, Richard E. Woods, MedData Interactive, Person 2017, 3 pages. (Abstract only provided).

P. Kaiser, D. Gonzalez-Aguirre, F. Schültje, J. Borràs, N. Vahrenkamp and T. Asfour, "Extracting wholebody affordances from multimodal exploration," 2014, 8 pages, IEEE-RAS International Conference on Humanoid Robots, Madrid.

Hochreiter, Sepp & Schmidhuber, Jürgen, "Long Short-term Memory. Neural computation," 1997, pp. 1-32.

Huang, Justin and Maya Cakmak, "Programming by Demonstration with User-Specified Perceptual Landmarks," 2016, pp. 1-9, CoRR abs/1612.00565.

Gottschlich et al., "The Three Pillars of Machine Programming" MAPL 2018: Proceedings of the 2nd ACM SIGPLAN International Workshop on Machine Learning and Programming LanguagesJun. 2018, 11 pages.

* cited by examiner

AUTOMATIC ROBOT PERCEPTION PROGRAMMING BY IMITATION LEARNING

FIELD OF THE DISCLOSURE

This disclosure relates generally to artificial intelligence and machine learning, and, more particularly, to automatic robot perception programming by imitation learning.

BACKGROUND

Robot dependent industries such as car manufacturing limit robots to specific, planned, and repetitive tasks. Other robot services are constrained to a single task such as vacuuming or to non-physical interaction jobs such as personal assistance or multimedia virtual assistance. Existing robot activity requires human experts to develop algorithms to create robot perception skills.

DETAILED DESCRIPTION

Figure 1:
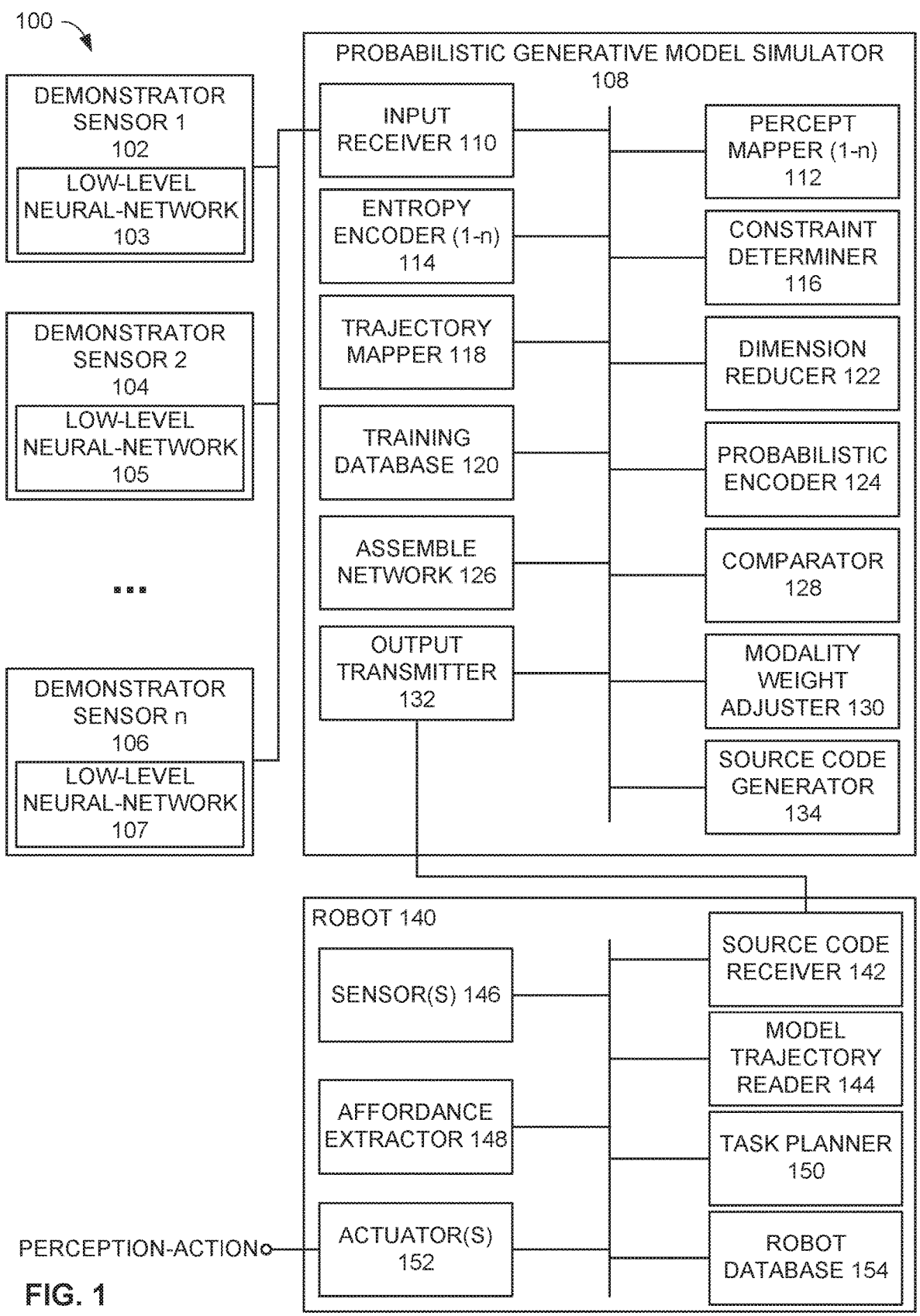
FIG. 1 is a block diagram of an example system for automatically programming robot perception imitation learning in accordance with the teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order, arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Disclosed herein are systems, apparatus, methods, and articles of manufacture for automatic robot perception programming by imitation learning. Robots include any machine that can perform a task and are not limited to any specific form such as, for example, a humanoid shape. Robots, including robots with artificial intelligence, should have advanced motor skills and advanced perceptual skills to execute valuable robot tasks in flexible environments. Some examples of such valuable robot service tasks include around the clock nursing and other health monitoring services and janitorial and maintenance operations services within human-centric spaces such as, for example, household environments, schools, hospitals, retail shops, etc.

Robot activity, services, tasks, or chores can be very complex due to large environmental variability. In these circumstances, the perception, planning, and control loop of the operation of the robot is challenged to robustly perform intricate force-aware motions to handle different objects including tools in different environments. Furthermore, these motions are applied on diverse object shapes with dynamic appearances and with non-rigid dynamics. Thus, the task-planning by robots performing services is based on object recognition with associated state estimation of the object, the environment, and the task. The examples disclosed herein leverage artificial intelligence for the perception and control of objects by a robot to enable a wide range of life-improving services with significant social and market value.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of ML models and/or ML architectures exist. In examples disclosed herein, a neural network model is used. In general, ML models/architectures that are suitable to use in the example approaches disclosed herein include semi-supervised ML. However, other types of ML models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the ML model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the ML model (e.g., a classification, an expected output value, etc.). Alternatively, unsupervised training (e.g., used in DL, a subset of ML, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until an acceptable amount of error is achieved. In examples disclosed herein, training is performed at remotely for example, at a data center and/or via cloud-based operation. Training is performed using hyperparameters that control how the learning is performed (e.g., a learning rate, a number of layers to be used in the ML model, etc.).

Training is performed using training data. In examples disclosed herein, the training data is locally generated data that originates from a demonstration of a task by a human. Once training is complete, the model is deployed for use as an executable construct that processes an input and provides an output based on the network of nodes and connections defined in the model.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the ML model. Also, in some examples, the output data may undergo post-processing after being generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In some examples, programing by demonstration or teach-in technologies are used to program robots for complex manipulation and assembling of objects. These techniques are an alternative to code-based programming approaches and are a paradigm to bridge semi-supervised learning methodologies to autonomous intelligent systems. With programing by demonstration, robots are provided with kinesthetic way-points associated with sematic labels that are easily perceived by fixed markers. For example, the robot may be provided with information such as, for example, where to move an object including a standard trajectory or sequence of points. The robot may also be provided with information such as, for example, when contact is made with an object, where to make contact with the object (e.g. which fingers or other actuators) and how much pressure to apply. These sources of information enable robots to create optimal trajectories and handling for moving goods, tools, and/or other objects.

The evolution of autonomous intelligent systems implemented in robots, as disclosed herein, is to provide more complex control for sensing and actuating tasks. The examples disclosed herein produce multimodal robot perception skills. The examples disclosed herein use ML including, for example, semi-supervised ML, to accomplish these tasks for many types of robots even in the presence of large sensor uncertainties, control uncertainties, and processing uncertainties. The complex control of objects and task performance enabled by the teachings of this disclosure include probabilistic enhancement. In other words, the robots can adapt to more variations in perception and movement. These teachings also include adaptive perception-action mapping. In addition, the examples disclosed herein are embodiment-independent, which enables robots of all types to be trained using sensors of different models and manufacturers.

Prior techniques to create robot perception skills required a human expert to develop algorithms and associated implementation instructions. Having a human expert producing perceptual skill software systems involves large cost. This cost is aggravated with non-compatible sensors causing a lack of reusability of the programming. The hardware (sensors, cameras, etc.) could have specific programming that is difficult or impossible to change or upgrade without requiring a wholesale retraining—i.e., a re-writing of the algorithms and instructions. Also, producing perceptual software modules requires significant amounts of time and cannot be easily parallelized because the design and implementations are usually iterative and requiring deep enrollment of the human expert(s). Further, combining or extending perceptual skills developed by human experts requires a significant amount of work that cannot be parallelized or delegated to simulations. In addition, validating and ensuring quality and safety (in form and time) of human coded perceptual skills requires implementation of test cases and validation workbenches (hardware and software), which are costly and labor-intensive practices. Also, these human coded systems require additional normalization or regularization metrics to compare diverse modalities.

Figure 2:
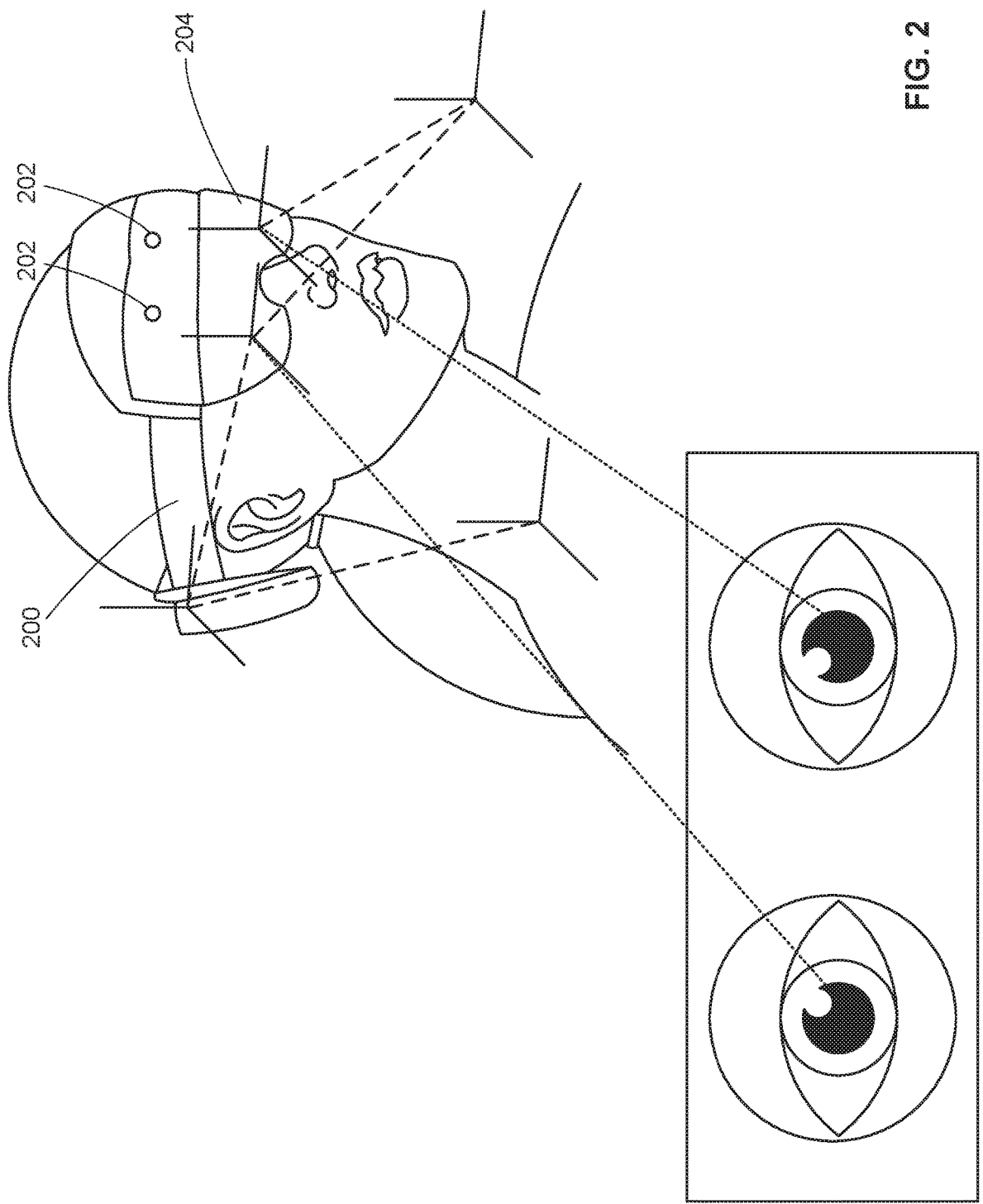
FIG. 2 is an illustration of an example head-mounted sensor.
Figure 3:
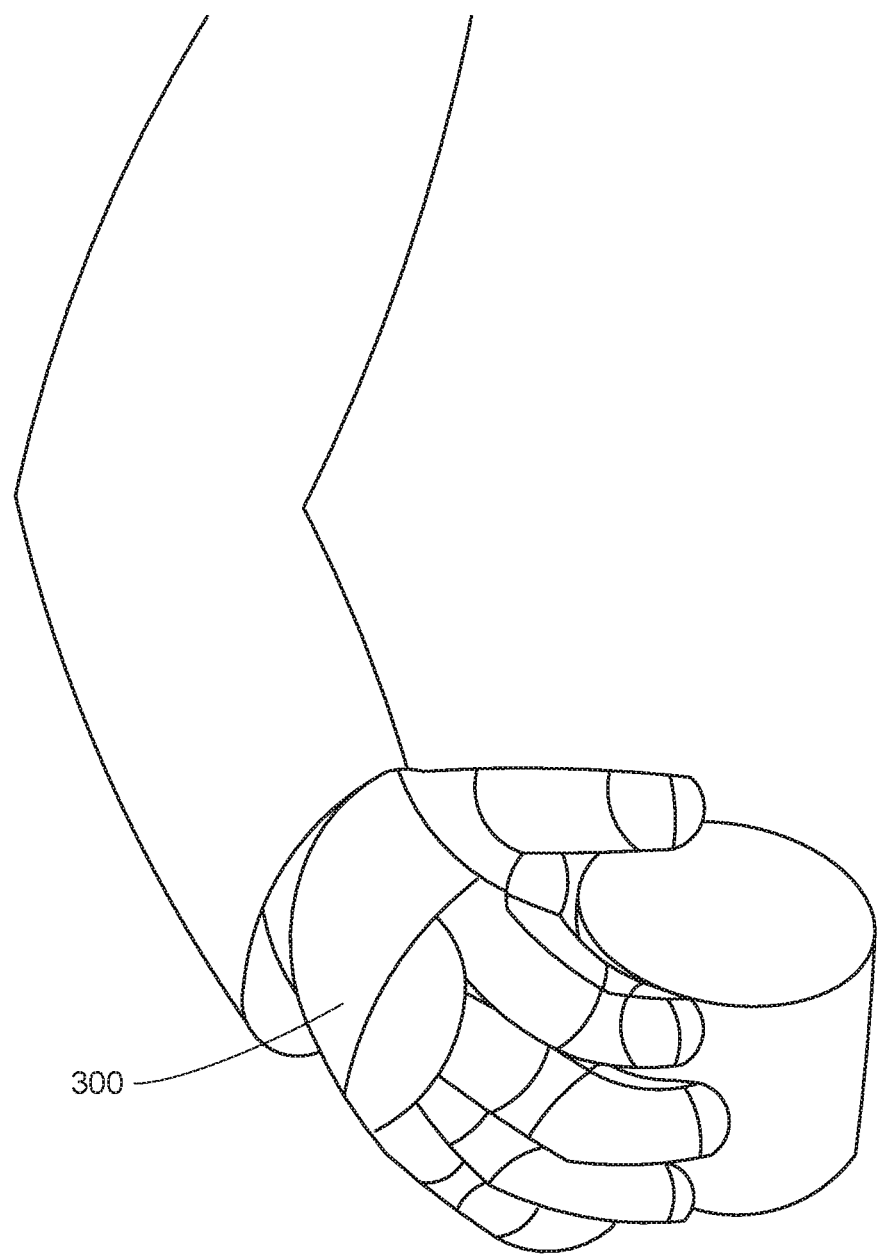
FIG. 3 is an illustration of an example data glove.

The examples disclosed herein are an advancement over manually programming perceptual skills for robots. The examples disclosed herein enable a human demonstrator to wear one or more device(s) and execute a task. Signals are gathered from the devices during performance of the task, and the examples disclosed herein learn and create full fledge source code that can be read by a robot to recreate these skills, actions, and perception used to perform the task. As disclosed below, the examples in this disclosure integrate heterogeneous signals gathered from the wearable devices and feature extraction algorithms. The resulting software attains concise perceptual outputs such as three-dimensional (3D) positions, 3D orientations, and multiple-category classification of objects and events in the application environment. Instead of engaging computer experts to develop robot perception code, any non-specialized user can create robot perceptual skills by simply wearing a few instruments (such as, for example, the head mounted sensor of FIG. 2 and the data glove of FIG. 3) and demonstrating how to realize and perceive a desired task. Further mathematical and technical means are disclosed below that use simulation for training neural networks with probabilistic methods that introduce variations into the robots' perception of objects and environments and task performance. The resulting source code can be compiled and/or generated in any computer.

The examples disclosed herein present a fully automatic software generation system capable of producing multimodal robot perception skills in form of source code. The produced software includes imitation-trained assemble(s) of artificial neural networks. The resulting implementation includes topology description, connection weights, and/or discrete convolution kernel functions. The source code can be automatically compiled into binary executable file(s) including, for example, (XPU—X Processing Unit) binary-code. In some examples, X may represent G, for a Graphics Processing Unit (GPU). In some examples, X may represent V, for a Vision Processing Unit (VPU). In some examples, X may represent T, for a Tensor Processing Unit (TPU). The code generation can also synthesize bit-streams for neural accelerators and other general programmable computing devices such as Field Programmable Gate Arrays (FPGAs).

An imitation learning system includes multiple phases: a perception phase, a segmentation phase, a representation phase, and a transfer phase, which respectively capture, section, analyze, and epitomize tracks of perception-action operations conducted by a human demonstrator. A first imitation learning path for robotic applications is a black-box approach. In a black-box approach, all sensor signals are combined into a single state-space that is processed as an input feature-map by a recurrent deep neural network or some other Long Short-Term Memory (LSTM)-like mechanism. This is a fully implicit acquisition and representation.

A second imitation learning path for robotic applications is a modular and explainable approach. In a modular and explainable approach, the sensing and acting are separated at the initial stages enabling parallel dichotomized learnings of symbolic objects and actions. This approach also enables integral limb-trajectory management including, for example, the generation, selection, and adaptation of trajectories.

There are advantages to the modular and explainable approach. One advantage is full embodiment independence. A single black-box learns behaviors by combining i) states of the environment, ii) inner specific transfer functions such as, for example, kinematic maps, and iii) other time-varying calibration sensitive sensor signals. These learned skills may not be translatable to other robots or may not remain stable as the robot hardware wear-off. Thus, these learned skills are dependent on the particular embodiment (e.g., robot model) trained. On the contrary, a full modular and explainable approach profits from replacing cognitive skills and hardware components on case-by-case basis for calibration and maintenance. This benefits robots as widespread service commodities.

Another advantage to the modular and explainable approach is validation by simulation. The system can be decomposed into motion, perception, and active-perception, which combines motion and perception. The skills are tied only to partial hardware association(s). Thus, it is possible to validate the system and any subsystems by simulation. This makes the robot task computationally tractable and enables on-demand replacement, combination, and upgrading of skills depending on hardware features. This is significantly important for composed perceptual skills where the ability to capture and represent entities or objects in the environment highly depends on various modalities such as, for example, with respect to sensing physical principles provided by different sensors. For example, the ability to capture the geometric structure of an object may not be possible by a single static RGB camera but it may be easy for a LIDAR, while LIDAR may not be able to capture explicit information in a barcode.

Another advantage to the modular and explainable approach is complementary device-aware neuro-mixtures. Because each of the perceptual or motor skills can be learned on a modular fashion, it is possible to combine output features, including respective partial output representations, and create connections between mixable latent spaces. The complementary information gain by sensors and/or actuators compensates for the mutual lack of signal information. Examples include combinations of i) joint-torque sensor and vision to emulate haptics, and ii) emulating range sensor with single monocular vision by camera motion in smooth pursuit by structure from motion.

Turning to the figures, FIG. 1 is a block diagram of an example system 100 for automatically programming robot perception imitation learning in accordance with the teachings of this disclosure. The system 100 includes a first demonstrator sensor 102, a second demonstrator sensor 104, an nth demonstrator sensor 106. In some examples, there is one demonstrator sensor. In some examples, the system 100 only has two demonstrator sensors. Other examples have any number of demonstrator sensors as shown, such as, for example ten, fifteen, one hundred, etc. The example demonstrator sensors 102, 104, 106 have respective low-level neural networks 103, 105, 107, which are disclosed in greater detail below.

The example system 100 also includes an example probabilistic generative model simulator 108. In some examples, the probabilistic generative model simulator 108 is cloud-based. In other examples, the probabilistic generative model simulator 108 is included at a data center. Also, in some examples, the probabilistic generative model simulator 108 is local to one or more robots being trained. The example probabilistic generative model simulator 108 includes an example input receiver 110, an example percept mapper 112, an example entropy encoder 114, an example constraint determiner 116, an example trajectory mapper 118, an example training database 120, an example dimension reducer 122, an example probabilistic encoder 124, an example assemble network 126, an example comparator 128, an example modality weight adjuster 130, an example output transmitter 132, and an example source generator 134. The probabilistic generative model simulator 108 is the model trainer, and operation of the probabilistic generative model simulator 108 represents the learning phase of the automatic robot perception programming by imitation learning processes disclosed herein.

The example system 100 also includes an example robot 140. The example robot 140 includes an example source code receiver 142, an example model trajectory reader 144, one or more example sensor(s) 146, an example affordance extractor 148, an example task planner 150, one or more example actuator(s) 152, and an example robot database 154. The robot 140 is the model executor, and operation of the robot 140 represents the inference phase of the automatic robot perception programming by imitation learning processes disclosed herein.

In examples disclosed herein, robot perception skill is created from demonstrations executed by humans. The example system 100 acquires data from human demonstrators. For example, a human demonstrator uses a set of instruments including one or more of the demonstrator sensors 102, 104, 106. In some examples, some of the demonstrator sensors 102, 104, 106 are on the person, and some other demonstrator sensors 102, 104, 106 are within the environment. The demonstrator performs a series of trials for a particular task. For instance, when training the robot 140 for household chores, the demonstrator can perform a task such as opening a door or moving a glass from a cupboard to a side board. During performance of the task, aspects of the human body and behavior are captured including, for example, hand movement, eye movement, etc. For example, an example system can record via demonstrator sensors 102, 104, 106 how a human uses/positions eyes to locate an object and then move/grab the object. Elements and cues of the object and the environment are also gathered by the demonstrator sensors 102, 104, 106 such as, for example, color, geometry, position, etc. To gather this data, in some examples, the demonstrator sensor 102 can be the head-mounted sensor 200 of FIG. 2, which captures eye movement. In another example, the demonstrator sensor 102 can be the data glove 300 of FIG. 3, which capture grip position and pressure. In other examples, the demonstrator sensors 102, 104, 106 can include 3D cameras, color and depth RGB-D cameras, infra-red cameras, and/or image capture devices in the environment. The demonstrator sensors 102, 104, 106 can include sensors that can scan QR codes, RFID tags, or other salient tags to gather object information. The demonstrator sensors 102, 104, 106 can include LIDAR devices, accelerometers, gyroscopes, strain gauges, etc.

The demonstrator sensors 102, 104, 106 are any device that captures physical interaction between human demonstrators and objects and the environment. In particular, the demonstrator sensors 102, 104, 106 gather position and orientation data. The demonstrator sensors 102, 104, 106 capture the motion of the human limbs and objects producing multidimensional continuous signals associated with the task, which in this example is moving an object to a position. The demonstrator sensors 102, 104, 106 are also used to extract skeletal representations of human kinematic configuration.

In addition to motion data, the cues and signals needed in training perceptual learning system are (i) on what the demonstrator is focusing and (ii) where the demonstrator is focusing. To capture these elements of perception, the example system 100 also uses the demonstrator sensors 102, 104, 106 to capture contact-less perception and contact perception.

Contact-less perception involves the fixation point, attention to object(s), and/or regions of the scene where the demonstrator human is focusing. Contact-less perception can be established, captured, and demonstrated by, for examples, tracking the six dimensional (6D) pose of the head and the gaze direction of the demonstrators' eyes by means of pupil tracking using, for example, the head-mounted sensor 200. The concrete signals obtained from the demonstrator sensors 102, 104, 106 are multiple time-varying kinematic frames. In this example, the head-based cues for imitation learning of perception can be represented by: $H(t) \in SE3 \subset R^{(4 \times 4)}$, and the target-object based cues can be represented by: $T(t) \in SE3 \subset R^{(4 \times 4)}$. The head-mounted sensor 200 includes face-front localized cameras 202 for eye and pupil tracking. The head-mounted sensor 200 also includes semi-transparent head mounted display 204 to provide the geometric relationship between eyes, neck, and objects in order to estimate H(t) and T(t) kinematic frames.

Contact perception involves intentional physical contact between the demonstrator and objects. Some contact points may be occluded to the RGB-D cameras or other sensors. One or more of the demonstrator sensors 102, 104, 106, such as the data glove 300, capture the interaction points between the demonstrator and the object. One or more of the demonstrator sensors 102, 104, 106, also measure pressure to identify target contact from unintentional contact produced by object proximity. The data glove 300 includes capacitive, resistive, and/or optical sensors to gather the contact data. Data related to the contact can include, for example, interaction points between demonstrator and object, pressure data, location data of where the object is contacted, temperature data, etc. The pressure data can be analyzed locally at the demonstrator sensor 102, 104, 106, and/or at the probabilistic generative model simulator 108 to determine if the pressure satisfies a threshold. Pressure that satisfies a threshold may be classified as an intended contact, and pressure that does not satisfy a threshold may be classified as an unintentional contact. The concrete signals obtained from the demonstrator sensors 102, 104, 106 are temporal key-frame collections: $\Psi(t) := \{(P_i, N_i, F_i)\}$ of contact points: $P_i \in R^3$. The contact points are oriented (expressed by normal vector): $N_i \in R^3 \mid (N_i \cdot N_i) = 1$ with an addition attribute of pressure: $F_i$ applied measured in sensor agnostic normalized scale, i.e.: $0 < F_i \leq 1$.

The demonstrator sensors 102, 104, 106 used to gather data from the human demonstrator, the environment, and/or any objects may include the respective low-level neural networks 103, 105, 107. The low-level neural networks 103, 105, 107 may be specific to the state of the respective demonstrator sensor 102, 104, 106. The low-level neural networks 103, 105, 107 could be pretrained. The low-level neural networks 103, 105, 107 could be specific to the demonstrator sensor model, and may be provided by demonstrator sensor manufacturer. The low-level neural networks 103, 105, 107 can trained for specific cues such as, for example, colors, edges of objects or surfaces, shapes, etc. Thus, the demonstrator sensors 102, 104, 106 may be percept-specific.

The input receiver 110 of the simulator 108 receives the raw data from the demonstrator sensors 102, 104, 106. The data from the demonstrator sensors 102, 104, 106 is used by the probabilistic generative model simulator 108 to teach a robot perception. The probabilistic generative model simulator 108 includes the percept mapper 112, which generates maps of a percept or multiple percepts. In some examples, there are n number of percept mappers 112 matching the number of demonstrator sensors. A percept is a specific type of sensory cue that indicates how an object is visible, stands out, etc. For example, a percept in visual sensing can be a particular edge of an object or a surface, a corner of an object or surface, a color, a shape, etc. A percept map can include, for example, an edge map, which is a map of edges in an environment (e.g., the edge of a staircase, the edge of a countertop, the edge of a desktop, the edge of a tool). In some examples, the percept map can be a color map (e.g., colors in the environment). In some examples, the percept map is what the robot sees. In one example, for a time varying n-dimensional signal $S_t \in R^n$ the percept mapper 112 uses a percept extractor k in form of a filter or a neural network $G_k(S_t) \mapsto R^m$ to transform the original signals into an m-dimensional percept map, where $m \leq n$.

Figure 4:
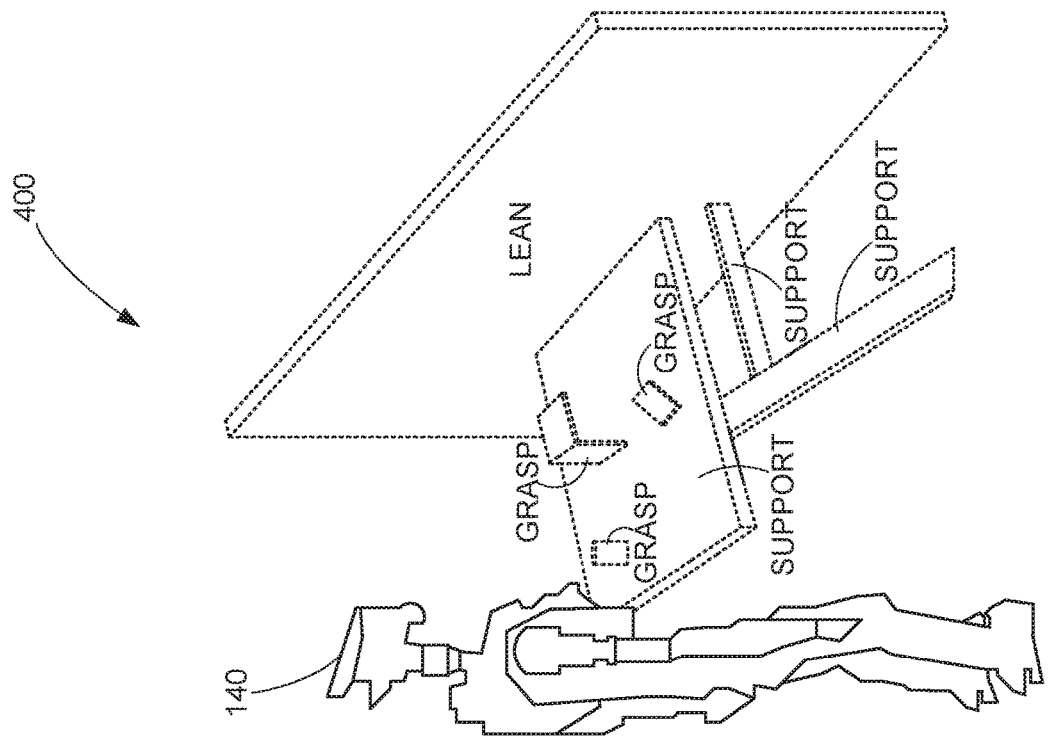
FIG. 4 is a schematic diagram of an example robot extracting a scene composition.
Figure 4:
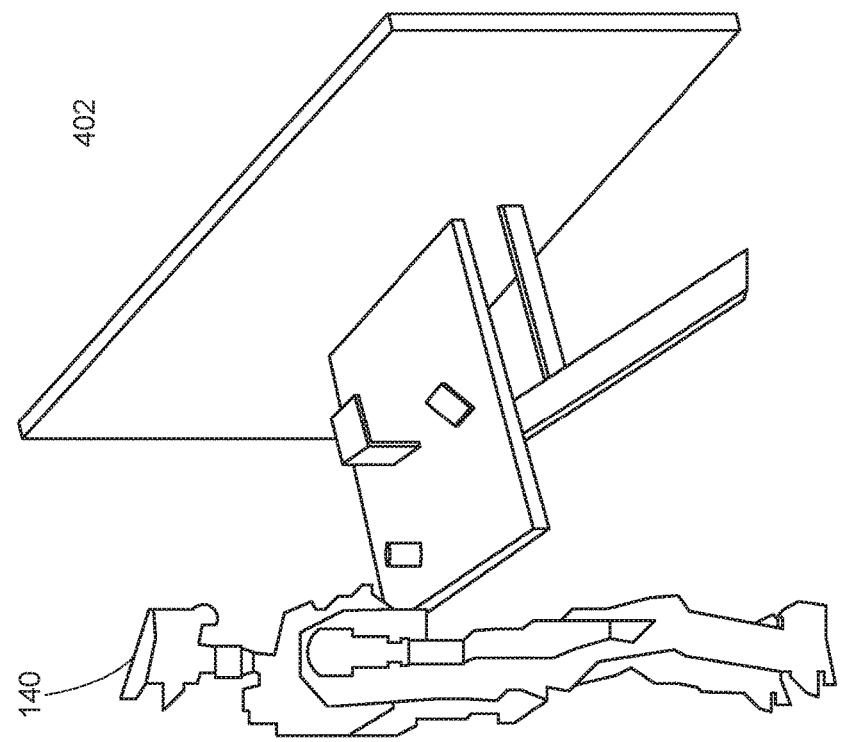

FIG. 4 shows an example percept map 400. The map 400 is an extraction of a scene composition by the robot 140. The percept map 400 includes planar patches extracted by the robot 140. In this example, the robot 140 is equipped with RGB-D cameras to express the scene composition of the environment 402 shown on the left of FIG. 4.

The probabilistic generative model simulator 108 includes the entropy encoder 114. In some examples, there are n number of entropy encoders 114 matching the number of demonstrator sensors. The entropy encoder 114 transforms the percept map into a unidimensional saliency value reflecting the information gain using, for example, the entropy encoder function $E(G_t) \mapsto R^+$. The saliency value is not upper bounded. The higher the saliency value, the more information the signal is incorporating to the demonstration process in a particular time. An example is a depth camera D. A 3D depth camera provides a signal $S_t^D \in R^{wh}$ with spatial resolution width w and height h in pixels. An example percept extracted from this signal type is a smooth surface patch such as, for example, the planar surfaces shown in the percept map 400 of FIG. 4. The planar surfaces are connected components of structured point-clouds that represent regions in the field of view forming local surface manifolds. The associated percept extractor $G_k^D(S_t^D) \mapsto \{(H_j \in R^4, (w, h, d) \in R^{+3})\}$ generates a collection of planar $H_j$ patches with boundaries (i.e. width—w, height—h and depth—d in meters). In this example, the dimensionality m is dynamically changing depending on the scene content (including, for example, the amount of visible patches), time, camera noise, etc. The surface-patch entropy encoding of $E_t^D(G_t^D) \mapsto R^+$ is defined as the ratio of the total pixel-points (1:1 in a structured point-cloud) contained within any planar patch and those outside those regions. Hence, the saliency information gain is bounded by $0 \leq E^D (G_k^D) \leq 1$.

In some examples, if the objects and/or environment have complex geometry, with little to no planar patches, the entropy encoder can determine a saliency of zero. In other examples, if there are simple and/or easy to identify objects and surfaces (e.g., there are many patches), the entropy encoder may determine that there is a saliency of 1. A percept-saliency ranking enables an objective assessment of the relevant degree of each combination of signal and percept used during a key frame of a trajectory model as disclosed below.

The probabilistic generative model simulator 108 includes the constraint determiner 116 to analyze data from the demonstrator sensors 102, 104, 106 to determine task constraints. The task constraints can include, for example, keeping a margin distance to an object, avoiding collisions (e.g., there may be a wall in a path of motion, there may be another object such as a faucet, etc.), identifying staircases, identifying doors, or secondary task considerations such as, for example, care needed when transporting liquids. The constraint determiner 116 may employ analysis such as, for example, Gaussian process regression, to obtain a prototypical trajectory with a similarity or invariance metric.

The probabilistic generative model simulator 108 includes the trajectory mapper 118. The trajectory mapper 118 uses a probabilistic generative model to map multi-modal-perceptual trajectories. After collecting the sequence of signals, including visual fixation poses, haptic contact points, and saliency rankings of the percepts for a particular scenario, the probabilistic generative model is applied to this data. The probabilistic generative model enables probabilistic representations for variational sampling. The ability to introduce random displacements or components into trajectories while sampling a generative model, ensures data richness while training, avoids overfitting a trajectory to a particular percept-action, and improves generalization.

When a demonstration is executed by the human there is a sequence of discrete key frames. Each discrete frame with a collection of values can be expressed as:

$$K_t := \{H(t) \in SE3 \subset R^{(4 \times 4)}, T(t) \in SE3 \subset R^{(4 \times 4)}, \Psi(t) := \{(P_i, N_i, F_i)\}, \{(G_0^D, E_0^D), (G_1^D, E_1^D), (G_2^D, E_2^D), \ldots, (G_n^D, E_n^D)\}\}$$

$K_t$ represents a multimodal-perceptual key frame. $H(t) \in SE3 \subset R^\wedge\{4 \times 4\}$ represents head-attention 6D pose. $T(t) \in SE3 \subset R^\wedge\{4 \times 4\}$ represents object-target 6D pose. $\Psi(t) := \{(P_i, N_i, F_i)\}$ represents M-oriented force contact set.

$\{(G_0^D, E_0^D), \{(G_1^D, E_1^D), (G_2^D, E_2^D), \ldots, (G_n^D, E_n^D)\}\}$ represents N saliency ranked percept pairs. The key frame $K_t$ is dynamically changing dimension depending on the amount of contacts points and detected percepts. A continuous sequence of frames within a time interval [a, b] such $K_{a \leq t \leq b}$ in a way that the maximal dimensionality $a_{a \leq t \leq b} = \max (n_{a \leq t \leq b}) + \max (m_{a \leq t \leq b}) + 12 = \dim (K_{a \leq t \leq b})$ is known in [a, b]. The key frames are a series of numbers in an array, which may be stored, for example, in the training database 120. The number of points varies over time, which results in different lengths of data depending on the point in time, the modality, the demonstrator, etc. For example, the data related to the head-attention 6D pose and the object-target 6D pose may have the same amount of data, i.e., these are fixed data sets (in terms of the amount of data points). In contrast, M and N can vary over time depending, for example, on how hard a demonstrator grasps an object or how many fingers the demonstrator wraps around to make contact with an object, etc. M and N can vary over time depending also on sensor resolution, noise, etc. Also different traits of an action may have different amounts of data. For example, the action of cleaning a table will contain variations of target objects, variations of elements in the scene, and variations in motions of the demonstrator's head and eye positions. Because of varying amounts of data, the trajectory mapper 118 normalizes the data. The frame with the maximum dimension in an interval is determined. Then the frames with fewer dimensions in the interval are padded with zeros until these frame have the same dimensions as the largest frame.

After the trajectory mapper 118 embeds frames with zeros or normalizes the frames, every frame has the same length of dimensions and the key frames are connected points in a $a_{a \leq t \leq b}$-dimensional space. This is the multimodal perceptual trajectory. Additional intervals and/or additional modalities may be added.

The trajectory mapper 118 produces a collection of multimodal-perceptual trajectories that are no longer depending on the size, proportions, or any other kinematic parameter of the human demonstrator. The collection of multimodal-perceptual trajectories may be stored in the training database 120. At this point, the multimodal-perceptual trajectory collection is distilled into an invariant representation that can be re-mapped to other physical robot systems on demand. The re-mapping can be translated to robots with arbitrary arm(s), forearm(s), sizes, etc. or even other types of joints (such as spherical or prismatic) as long as there are enough degrees of freedom for the motions described in the multimodal-perceptual trajectories to be executed.

The dimension reducer 122 applies a dimensionality reduction such as Principal Component Analysis (PCA) to the collections of multimodal-perceptual trajectories. The dimension reducer 122 removes redundant data to produce a non-redundant and more compact representation of the perceptual actions, namely $\phi_a$.

Human perceptual behavior is observed over an aggregate of human demonstrators and/or performances of tasks. The probabilistic encoder 124 analyzes the data to consider variability of trajectories taken by different people and/or over different trials, mean trajectories, the spread of trajectories, etc. The probabilistic encoder 124 extracts imitation content from the collection of trial vectors (the collection of multimodal-perceptual trajectories) by describing the actions taken by the human demonstrator including variability of the action in terms of i) expectancy (or the mean curve), and ii) structural spreading (or covariance). The covariance $\Sigma_{\phi_q}$ describes the dimensional interdependence, mutual spreading of the perceptual trajectories and perceptual variations, and mutual relationships of the diverse modalities. The probabilistic encoder 124 also creates random and plausible deviations from the mean perceptual trajectory. To generate new stochastic samples from the $\phi_a$, the probabilistic encoder 124 conducts matrix diagonalization to $\Sigma_{\phi_q} | Q \lambda Q^{-1} = \Sigma_{\phi_q}$ (decompose into $\Sigma_{\phi_a}$ Eigen vectors Q and eigenvalues $\lambda$). From these structural components, the perceptual trajectory is: $\phi_\alpha^\beta = \text{diag}(\beta \cdot Y) \ Q + \bar{\phi}_\alpha$. Here diag $(\beta \cdot Y)$ is a diagonal matrix of dimension $\alpha_{a \leq t \leq b}$ whose elements are the product of the eigenvalue (dimension wise) and the (independent and identically distributed) unitary random function $-1<Y<1$. $\beta$ represents randomness. Y represents the action the robot should have taken. A parameter of $0<\beta<3$ is a scalar that determines the level of variation or deviation from the mean perceptual trajectory. The larger the value, the less similar the generated exemplar is to the mean trajectory. The bounds 0 to 3 are heuristics to keep the training samples generated within a threshold percentage of the hypervolume of all of the trajectories. The threshold percentage is determined for the action to be real motion. In some examples, the threshold percentage is 99.7%. In some examples, $\beta=3$ implies the threshold of 99.7% under some Gaussian distributions.

Thus, the probabilistic encoder 124 shifts dimensions in the collection of trajectories close to the mean to vary the scenarios. Different humans make actions in different ways to obtain the same or similar results. Also, the same human may make different actions during different trials of the same activity to obtain the same or similar results. The probabilistic encoder 124 enters the variance randomly and can generate millions of scenarios. This rich volume of data is used to train the network to provide the expected actions in terms of perception of what the robot should do based on the human motion.

Figure 5:
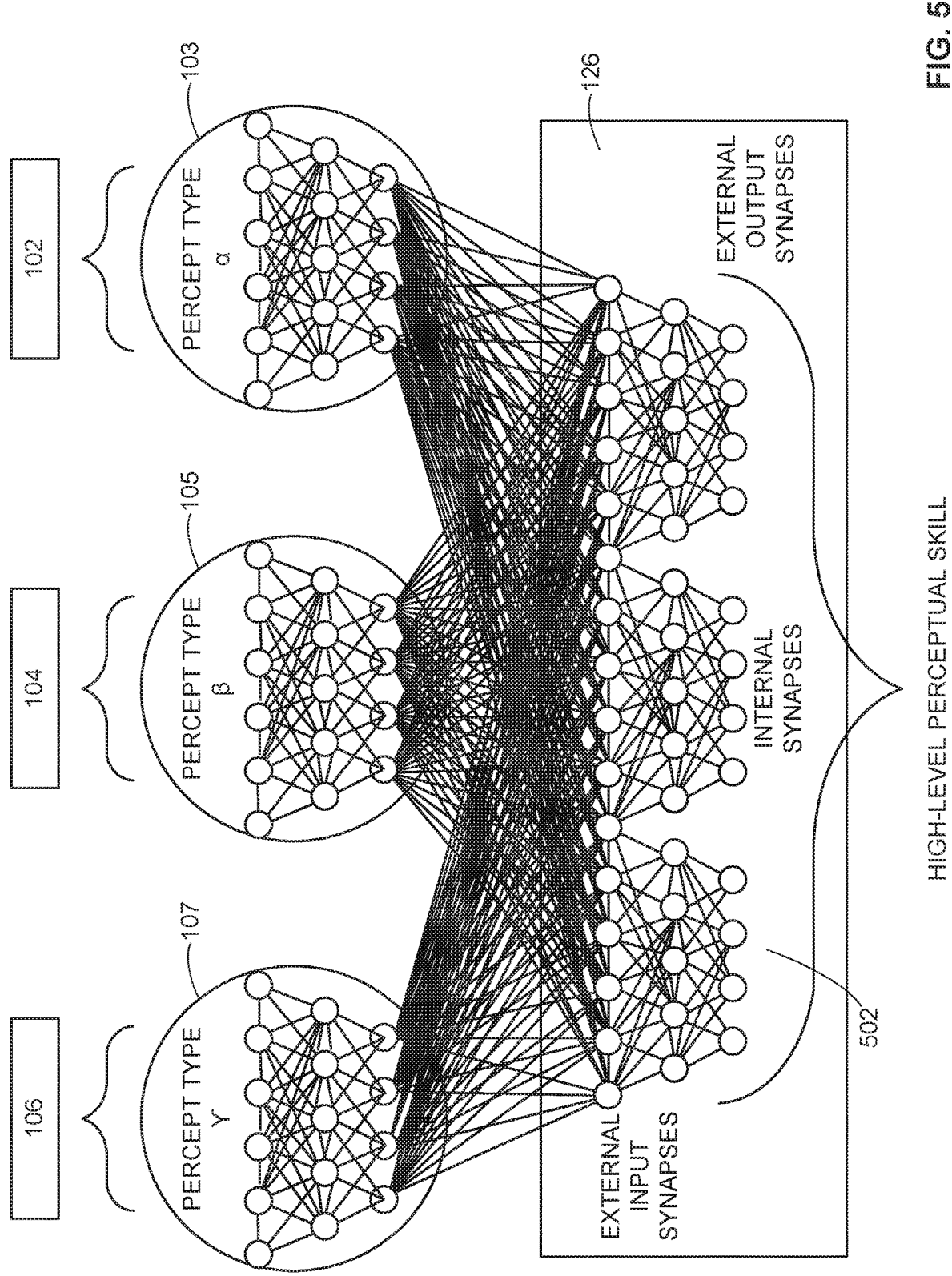
FIG. 5 is a schematic diagram of example synapse connections in the example assemble network of FIG. 1.

Once the demonstrations have been conducted and probabilistic generative models are extracted, the assemble network 126 creates perceptual skill by training assembles of low-level neural networks or subnets of different modalities. FIG. 5 shows an example topology for a perceptual skill that integrates three percept subnets corresponding to the low-level neural networks 103, 105, 107. In this example, the first subnet or low-level neural network 103 relates to percept $\alpha$, which is a modality gathered by the first demonstrator sensor 102. The second subnet or low-level neural network 105 relates to percept 13, which is a modality gathered by the second demonstrator sensor 104. The third subnet or low-level neural network 107 relates to percept $\gamma$, which is a modality gathered by the nth demonstrator sensor 106. The subnets 103, 105, 107 in this example are relatively simple in that the subnets 103, 105, 107 are compact, shallow, isolated, and single modality. In addition, in this example, the subnets 103, 105, 107 are percept-specific and device-dependent networks. Also, in this example, the subnets 103, 105, 107 are pre-trained networks. The skill composed by the assemble network 126 is a more complex skill that amalgamates the specific skills of the three percepts $\alpha$, $\beta$, and $\gamma$.

The assemble network 126 takes the output from the subnets 103, 105, 107 as inputs and processes the output internally to fuse and mutually complement the internal scene representation from the demonstrator sensors 102, 104, 106 within the latent space of environment in which the robot task is to occur. The subnets 103, 105, 107 are not modified during the process. In some examples, the assemble network 126 is structured having multiple outputs such as 6D poses, trajectories, and other common categorization labels.

The probabilistic generative model simulator 108 creates a supervised signal from the demonstration via the probabilistic generative model $\phi_\alpha^\beta$, which provides the expected perceptual outcomes given the simulated input signals from the demonstrator sensors 102, 104, 106 and the subnets 103, 105, 107. The supervised signal that is output is probabilistic and variational in the sense that the supervised signal that is output differs randomly each time it is generated.

The comparator 128 determines if supervised signal deviates from the mean expected behavior proportional to $\beta$. Each modality-percept i in the probabilistic generative model provides two cues: the expected percepts map $G_i^D$ and the saliency $E_i^D$. The modality weight adjuster 130 adjusts inner weights of the internal synapses 502 of the assemble network 126 to account for numerical values obtained by automatic derivatives (i.e. reverse-mode differentiation) and applies kernel weighting (a Gaussian $k_g$) over the current saliency in view of the expected saliency, namely $k_g(E_{i,t}^{D(S)} - E_{i,t}^D)$, where $E_t^{D(S)}$ stands for the information gain by modality-precept i gained in simulation versus the captured mean programming by demonstration counterpart. The modality weight adjuster 130 adjusts the gain (or decay depending on the case) to adjust weighting of different modalities to increase or penalize the deviations not only depending on the percepts similarity but also the degree of information gain by each sensor during a phase of the perceptual trajectory.

The training satisfactory concludes once the modality weight adjuster 130 adjust weights of the assemble network 126 such that the deviation between expect perceptual results compared with the probabilistic generative model $\phi_\alpha^\beta$ are below a domain threshold $\varepsilon$.

In case the quality and nature of the simulation differs significantly from the reality captured during demonstrations, the convergence of the learning may dwell in an asymptotic region, which will not reach the threshold $\varepsilon$ in a reasonable time. In that case, the simulation capabilities are not fulfilling the learning process, and the probabilistic generative model simulator 108 concludes the skill cannot be composed based on simulation limits. For example, the simulation could involve high quality audio, where the robot may not have sufficient capability. Also, in some examples where the trajectory includes multipath and multi-iteration continuous processes such as multispectral radiosity, acoustic resonance, etc., there may be oscillatory convergence behaviors produced when the simulation needs to render these extremely complex physical effects. In these examples, the probabilistic generative model simulator 108 may send a warning or other notice through the output transmitter 132 that imitation learning cannot be accomplished. In some examples, the probabilistic generative model simulator 108 outputs a message indicating that a different sensor may be needed to capture the reality and enable training. For example, the probabilistic generative model simulator 108 may indicate that a low frequency microphone or a super frequency microchips should be used with the robot to enable imitation training. This allows the user to enjoy the imitation training while avoiding the need for a wholesale new system configuration.

With the appropriate weight set for the scenarios in which imitation learning is obtainable, the source code generator 134 generates source code that may be, for example, standard neural network description language. In some examples, the source code gives the content of, for example, the assemble network 126 (e.g., FIG. 5) without the simulation. In some examples, the source code is embedded with the weights. In some examples, the source codes is encrypted for security and monetization (which may be used in licensing arrangements). In some examples, the source code can be one file.

In some examples, the source code generator 134 generates the source code in two stages: prior to the training (proprietary learning mode) and after the training is successful (open release mode). In the first stage, the connections with the demonstrator sensors 102, 104, 106 comes from the probabilistic generative model simulator 108 so that trials can be evaluated in batches. Once the assemble network 126 and probability weight adjuster 130 fulfill the target convergence criteria (i.e., the deviation between expect perceptual results compared with the probabilistic generative model satisfy the domain threshold ε), then the source code generator 134 produces the release source code in one or more languages. In some examples, a neural network description (NND) language such as, for example, MaxStrange or CNTK are employed to produce an execution-agnostic representation of the trained networks. An example of Network Description Language for intermediate representation of trained neural networks is:

```
SDim=784
HDim=256
LDim=10
B0=Parameter(HDim)
W0=Parameter(HDim, SDim)
features=Input(SDim)
labels=Input(LDim)
Times1=Times(W0, features)
Plus1=Plus(Times1, B0)
RL1=RectifiedLinear(Plus1)
B1=Parameter(LDim, 1)
W1=Parameter(LDim, HDim)
Times2=Times(W1, RL1)
Plus2=Plus(Times2, B1)
CrossEntropy=CrossEntropyWithSoftmax(labels, Plus2)
ErrPredict=ErrorPrediction(labels, Plus2)
FeatureNodes=(features)
LabelNodes=(labels)
CriteriaNodes=(CrossEntropy)
EvalNodes=(Err Predict)
OutputNodes=(Plus2)
```

In the example above, the connection weight and/or discrete convolution functions are stored separately in encrypted binary file for licensing or security aspects. Using the NND-file and the binary file with the training result, it is possible have multiple language specific translators to generate raw source code for the desired platform. These are actually plug-ins to the framework. These modules enable specialized generation tools suitable for any language or device. The plug-in architecture with standardized NND ensures forward compatibility with all computational devices and operative systems. Thus, the source code can be compiled or generated in any computing device. The output transmitter 130 transmits the source code to the robot 140. The source code is stored in the training database 120.

In some examples, in the probabilistic generative model simulator 108, the percept mapper 112 implements means for identifying percepts. The means for identifying percepts may be implemented by a processor such as the processor 812 of FIG. 8 executing instructions such as the instructions of FIG. 6. In some examples, the entropy encoder 114 implements means for calculating saliency. The calculating means may be implemented by a processor such as the processor 812 of FIG. 8 executing instructions such as the instructions of FIG. 6. In some examples, the trajectory mapper 118 implements means for mapping a trajectory. The mapping means may be implemented by a processor such as the processor 812 of FIG. 8 executing instructions such as the instructions of FIG. 6. In some examples, the probabilistic encoder 124 implements means for determining variations of a trajectory. The means for determining variations of a trajectory may be implemented by a processor such as the processor 812 of FIG. 8 executing instructions such as the instructions of FIG. 6. In some examples, the assemble network 126 implements means for imitating an action. The imitating means may be implemented by a processor such as the processor 812 of FIG. 8 executing instructions such as the instructions of FIG. 6. In some examples, the comparator 128 implements means for determining a deviation of an action. The means for determining a deviation of an action may be implemented by a processor such as the processor 812 of FIG. 8 executing instructions such as the instructions of FIG. 6. In some examples, the modality weight adjuster 130 implements means for changing a weight of a simulated signal. The means for changing a weight of a simulated signal may be implemented by a processor such as the processor 812 of FIG. 8 executing instructions such as the instructions of FIG. 6. In some examples, the source code generator 134 implements means for creating source code. The creating means may be implemented by a processor such as the processor 812 of FIG. 8 executing instructions such as the instructions of FIG. 6. In some examples, the constraint determiner 116 implements means for identifying a constraint in an environment an action. The means for identifying a constraint in an environment may be implemented by a processor such as the processor 812 of FIG. 8 executing instructions such as the instructions of FIG. 6.

The source code receiver 142 of the robot 140 receives the source code from the probabilistic generative model simulator 108. The model trajectory reader 144 compiles the source code to access the collection of trajectories.

The robot 140 includes the sensor(s) 146 to gather data regarding the environment and the robot's characteristics such as, for example, location, temperature, position, objects and surfaces in the environment, etc. The data from the sensor(s) 146 provide the robot 140 tools needed for perception and action.

The affordance extractor 148 analyzes the data from the sensor(s) 146 to determine affordances. Affordances are relationships between the robot, an action performed, an object on which this action is performed, and the observed effect. Different cues from the sensors 146 such as, for example, shapes in the environment, indicate to the robot 140 different affordances. For example, as shown in the mapping 400 of FIG. 4, the table indicates the affordance of support. The wall indicates the affordance of lean. The objects on the table indicate affordances of grasp. Other shapes, sizes, colors, temperatures, positions, etc. of objects and/or structures provide other affordances to the robot 140.

The task planner 150 combines the affordances and the trajectories and plans execution of a task. For example, if the robot 140 is tasked to clean the room in the map 400 of FIG. 4, the task planner 150 can establish a plan for cleaning the room by planning a series of concrete actions or perception-action trajectories in view of the affordances to accomplish cleaning the room.

In some examples, the task planner 150 performs a pre-execution safety check. Robots move differently than humans and a recreation of human movement may not produce the same result on a robot. Thus, before the robot 140 conducts the motions to be produced in accordance with the trajectories, the task planner 150 simulates the motion taking into account data from the sensor(s) 146 and parameters of the robot's operation including, for example, torque, speed, and other physical (hardware and environmental) limitations to ensure safe and doable performance of the task.

If the task planner 150 determines that the execution of the task is safe, the actuator(s) 152 execute the percept-action trajectory to perform the task. One or more of the source code, sensor data, affordances, trajectory collection may be stored in the robot database 154 for future use or reference.

In some examples, the source code receiver 142 implements means for receiving source code. The receiving means may be implemented by a processor such as the processor 912 of FIG. 8 executing instructions such as the instructions of FIG. 7. In some examples, the model trajectory reader 144 implements means for modeling a trajectory. The modeling means may be implemented by a processor such as the processor 912 of FIG. 8 executing instructions such as the instructions of FIG. 7. In some examples, the affordance extractor 148 implements means for extracting or determining affordances. The means for extracting or determining affordances may be implemented by a processor such as the processor 912 of FIG. 8 executing instructions such as the instructions of FIG. 7. In some examples, the task planner 150 implements means for planning execution of a task. The planning means may be implemented by a processor such as the processor 912 of FIG. 8 executing instructions such as the instructions of FIG. 7. In some examples, the actuator(s) 152 implement means for executing a percept-action trajectory. The execution means may be implemented by a processor such as the processor 912 of FIG. 8 executing instructions such as the instructions of FIG. 7.

While example manners of implementing the example probabilistic generative model simulator 108 and/or the example robot 140 are illustrated in FIG. 1, one or more of the elements, processes, and/or devices illustrated in FIG. 1 may be combined, divided, re-arranged, omitted, eliminated, and/or implemented in any other way. Further, the example first demonstrator sensor 102, the example first low-level neural network 103, the example second demonstrator sensor 104, the example second low-level neural network 105, the example nth demonstrator sensor 106, the example nth low-level neural network 107, the example input receiver 110, the example percept mapper 112, the example entropy encoder 114, the example constraint determiner 116, the example trajectory mapper 118, the example training database 120, the example dimension reducer 122, the example probabilistic encoder 124, the example assemble network 126, the example comparator 128, the example modality weight adjuster 130, the example output transmitter 132, the example source code generator 134, the example source code receiver 142, the example model trajectory reader 144, the example sensor(s) 146, the example affordance extractor 148, the example task planner 150, the example actuator(s) 152, the example robot database 154, and/or, more generally, the example probabilistic generative model simulator 108 and/or the example robot 140 of FIG. 1 may be implemented by hardware, software, firmware, and/or any combination of hardware, software, and/or firmware. Thus, for example, any of the example first demonstrator sensor 102, the example first low-level neural network 103, the example second demonstrator sensor 104, the example second low-level neural network 105, the example nth demonstrator sensor 106, the example nth low-level neural network 107, the example input receiver 110, the example percept mapper 112, the example entropy encoder 114, the example constraint determiner 116, the example trajectory mapper 118, the example training database 120, the example dimension reducer 122, the example probabilistic encoder 124, the example assemble network 126, the example comparator 128, the example modality weight adjuster 130, the example output transmitter 132, the example source code generator 134, the example source code receiver 142, the example model trajectory reader 144, the example sensor(s) 146, the example affordance extractor 148, the example task planner 150, the example actuator(s) 152, the example robot database 154, and/or, more generally, the example probabilistic generative model simulator 108 and/or the example robot 140 could be implemented by one or more analog or digital circuit(s), logic circuits, programmable processor(s), programmable controller(s), graphics processing unit(s) (GPU (s)), digital signal processor(s) (DSP(s)), application specific integrated circuit(s) (ASIC(s)), programmable logic device (s) (PLD(s)), and/or field programmable logic device(s) (FPLD(s)). When reading any of the apparatus or system claims of this patent to cover a purely software and/or firmware implementation, at least one of the example, first demonstrator sensor 102, the example first low-level neural network 103, the example second demonstrator sensor 104, the example second low-level neural network 105, the example nth demonstrator sensor 106, the example nth low-level neural network 107, the example input receiver 110, the example percept mapper 112, the example entropy encoder 114, the example constraint determiner 116, the example trajectory mapper 118, the example training database 120, the example dimension reducer 122, the example probabilistic encoder 124, the example assemble network 126, the example comparator 128, the example modality weight adjuster 130, the example output transmitter 132, the example source code generator 134, the example source code receiver 142, the example model trajectory reader 144, the example sensor(s) 146, the example affordance extractor 148, the example task planner 150, the example actuator(s) 152, the example robot database 154, the example probabilistic generative model simulator 108, and/or the example robot 140 are hereby expressly defined to include a non-transitory computer readable storage device or storage disk such as a memory, a digital versatile disk (DVD), a compact disk (CD), a Blu-ray disk, etc. including the software and/or firmware. Further still, the example first demonstrator sensor 102, the example first low-level neural network 103, the example second demonstrator sensor 104, the example second low-level neural network 105, the example nth demonstrator sensor 106, the example nth low-level neural network 107, the example input receiver 110, the example percept mapper 112, the example entropy encoder 114, the example constraint determiner 116, the example trajectory mapper 118, the example training database 120, the example dimension reducer 122, the example probabilistic encoder 124, the example assemble network 126, the example comparator 128, the example modality weight adjuster 130, the example output transmitter 132, the example source code generator 134, the example source code receiver 142, the example model trajectory reader 144, the example sensor(s) 146, the example affordance extractor 148, the example task planner 150, the example actuator(s) 152, the example robot database 154, the example probabilistic generative model simulator 108, and the example robot 140 of FIG. 1 may include one or more elements, processes, and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
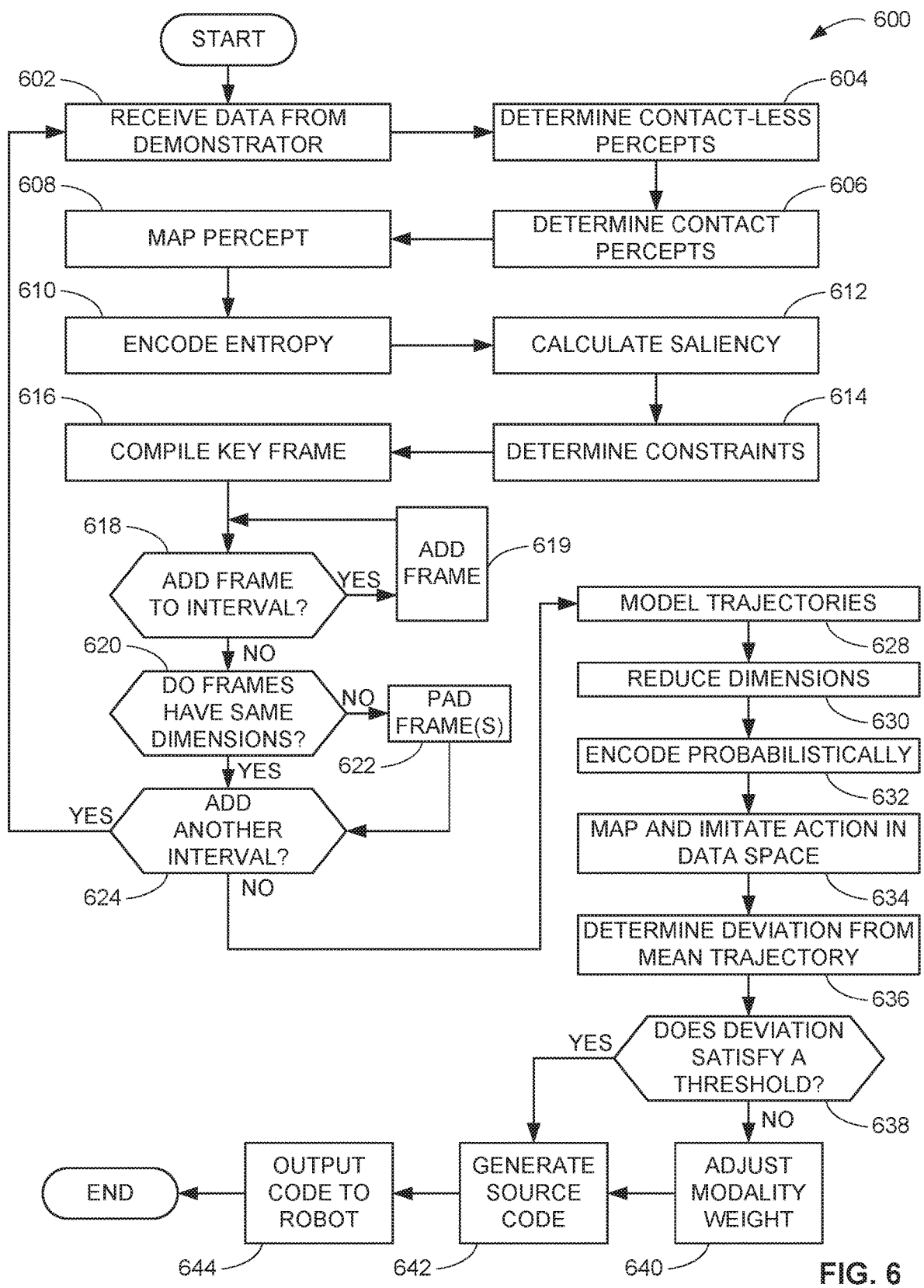
FIG. 6 is a flowchart representative of machine readable instructions which may be executed to implement the example probabilistic generative model simulator of FIG. 1.

A flowchart representative of example hardware logic, machine readable instructions, hardware implemented state machines, and/or any combination thereof for implementing the example probabilistic generative model simulator 108 of FIG. 1 is shown in FIG. 6. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware.

Figure 7:
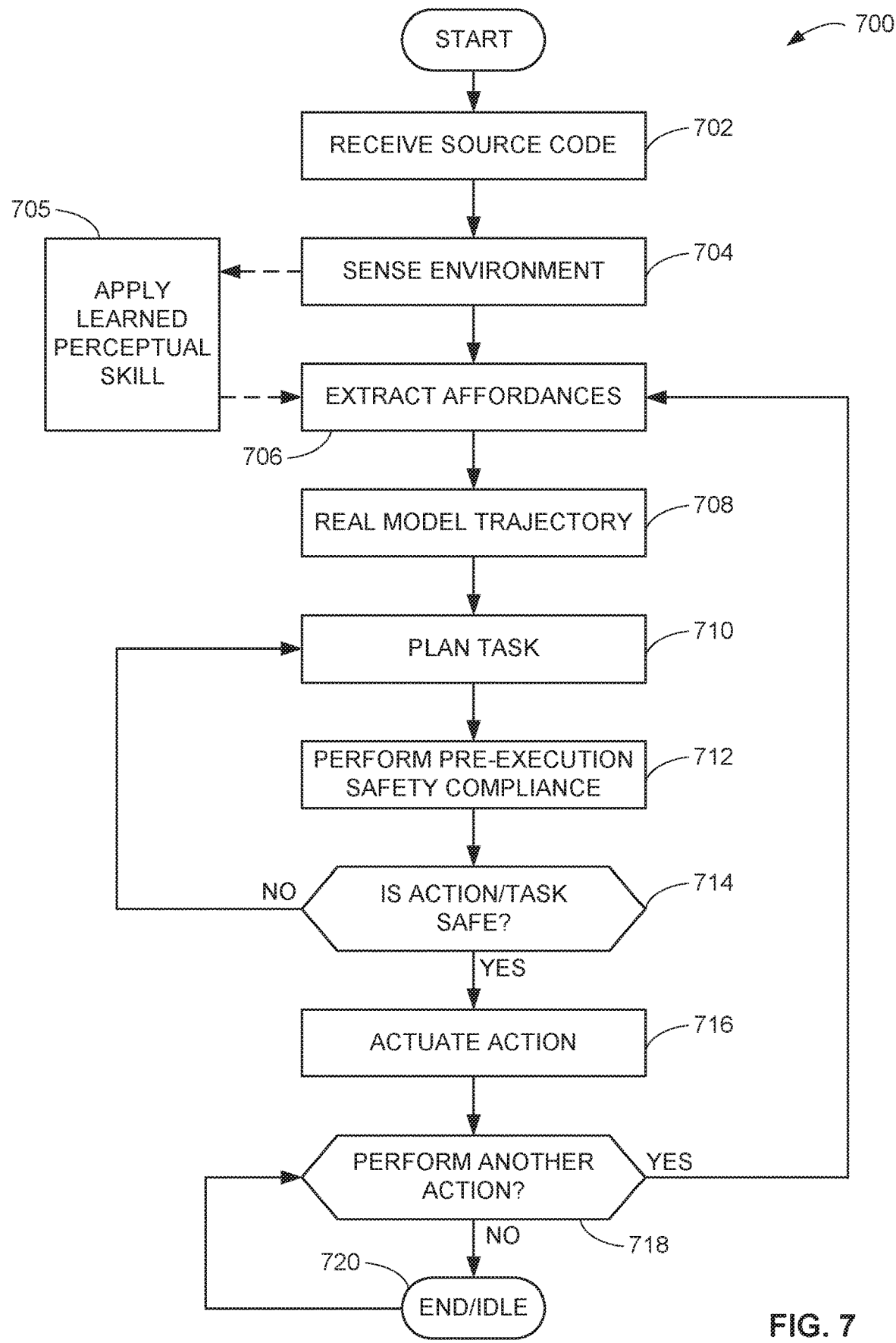
FIG. 7 is a flowchart representative of machine readable instructions which may be executed to implement the example robot of FIG. 1.

A flowchart representative of example hardware logic, machine readable instructions, hardware implemented state machines, and/or any combination thereof for implementing the robot 140 of FIG. 1 is shown in FIG. 7. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 12 and/or embodied in firmware or dedicated hardware.

Further, although the example program is described with reference to the flowchart illustrated in FIG. 6, many other methods of implementing the example probabilistic generative model simulator 108 may alternatively be used. Similarly, although the example program is described with reference to the flowchart illustrated in FIG. 7, many other methods of implementing the example robot 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device, and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, etc.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example program 600 includes the exploitation of probabilistic generative models via simulation in perceptual-learning grounded on programming by demonstration. The program 600 includes the input receiver 110 of the probabilistic generative model simulator 108 receiving data from the demonstrator (block 602). In this example, the input receiver 110 receives data from the one or more of the demonstrator sensors 102, 104, 106.

The percept mapper 112 determines contact-less percepts (block 604). For example, the percept mapper 112 determines, based on the data from the one or more of the demonstrator sensors 102, 104, 106, where a demonstrator was focused and on what a demonstrator was focused. The percept mapper 112 also determined contact percepts (block 606). For example, the percept mapper 112 determines, based on the data from the one or more of the demonstrator sensors 102, 104, 106, physical engagement between the demonstrator and object(s) and/or the environment. The percept mapper 112 maps the percepts (block 608). For example, the percept mapper 112 creates a map such as, for example, the map 400 of FIG. 4, which shows the scene or environment.

The program 600 also includes the entropy encoder 114 encoding entropy (block 610) and calculating saliency (block 612). In this example, the entropy encoder 114 uses the entropy encoder function (e.g., $E(G_t) \mapsto R^+$) to transform the percept map into a saliency value. The saliency value reflects the information gain. The higher the saliency value, the more information the signal is incorporating to the demonstration process in a particular time including, for example, the identification of objects and/or surfaces in an environment.

The program 600 also includes the constraint determiner 116 determining constraints (block 614). The constraints are determined based on the percept map to identify restrictions limitations to movements the robot 140 can make. For example, constraints identify distance margins to be kept from objects or surfaces, obstacles to avoided to prevent collisions, staircases, doors, etc. Constraints may also be based on task considerations that include how to handle specific objects or categories of objects.

The trajectory mapper 118 compiles a key frame (block 616). The trajectory mapper 118 uses a probabilistic generative model to map multimodal-perceptual trajectories, which are represented by a sequence of key frames within a time interval. The trajectory mapper 118 determines if there is an additional frame to add to the interval (block 618). If there is an additional frame to add to the interval, the trajectory mapper 118 adds a frame (block 619).

If there are no additional frames to add to the interval, the trajectory mapper 118 determines if the frames have the same dimensions (block 620). Frames may have different dimensions depending, for example, on idiosyncrasies of the demonstrator and/or the demonstrator sensor 102, 104, 106. Different people move in different ways, different people move at different speeds, objects may be grasped differently, different sensors gather differ types of data, different sensors have different resolution. These differences can lead to key frames having different dimensions because of the different data contained therein. If the frames have different dimensions (block 620), the trajectory mapper 118 pads one or more of the frames (block 622). For example, the trajectory mapper 118 pads a frame with zeros until the frame has the same dimensions as the frame with the largest dimensions.

If the trajectory mapper 118 determines that the frames have the same dimensions (block 620) and/or after the frames are padded (block 622), the trajectory mapper 118 determines if there are additional intervals to add to the trajectory mapping (block 624). If there are additional intervals to add, the program 600 continues with the input receiver 110 of the probabilistic generative model simulator 108 receiving data from the demonstrator (block 602).

In some examples, the example program 600 also determines if there are additional modalities to add to the trajectory mapping. If there are additional modalities to add, the program 600 includes the input receiver 110 of the probabilistic generative model simulator 108 receiving data from the demonstrator of the additional modalities and continuing from block 602. In other examples, modalities are all included from the beginning because it is known in advance which sensors are included in the target robots.

After the trajectory mapper 118 normalizes the frames by embedding one or more frames with zeros (block 622) and/or adding additional intervals (block 624), the trajectory mapper 118 models a plurality of multimodal-perceptual trajectories (block 628). The dimension reducer 122 reduces dimensions of the trajectories (block 630). For example, the dimension reducer 122 applies a dimensionality reduction to removes redundant data to produce a non-redundant and more compact representation of the perceptual actions.

The probabilistic encoder 124 encodes the trajectories probabilistically (block 632). The probabilistic encoder 124 considers variability of trajectories taken by different people and/or over different trials, mean trajectories, the spread of trajectories, etc. to creates random and plausible deviations from the mean perceptual trajectory to create a collection of trajectories.

The assemble network 126 maps and imitates an action (i.e., one of the trajectories) in a data space (block 634) representative of an environment in which the robot task is to occur, which provides the expected perceptual outcomes given the simulated input signals from the demonstrator sensors 102, 104, 106 and the low-level neural networks or subnets 103, 105, 107.

The comparator 128 determines the deviation of the imitated trajectory from the mean trajectory (block 636). The comparator also determines if the deviation satisfies a threshold deviation (block 638). For example, the comparator 128 can determine if the expected behavior is within a threshold (e.g., $\varepsilon$) of the results of the probabilistic generative model.

If the comparator 128 determines that the deviation does not satisfy a threshold, the modality weight adjuster 130 adjusts one or more weights of one or more of the modalities (block 640). For example, the modality weight adjuster 130 adjusts the inner weights of the internal synapses 502 between modalities in the assemble network 126. The modality weight adjuster 130 adjusts the gain (or decay depending on the case) to adjust weighting of different modalities to change the deviations of the trajectory from the mean.

If the comparator 128 determines that the deviation does satisfy a threshold (block 638), the appropriate weights are set, and the source code generator 134 generates source code (block 642). The source code can be compiled or generated in any computing device. The output transmitter 130 outputs the source code to the robot 140 or other computing device or storage repository (block 404).

The example program 700 of FIG. 7 includes execution of an imitation leaning process by the robot 140 to perform perception-actions. The source code receiver 142 of the robot 140 receives the source code (block 702). One or more sensors 146 of the robot 140 sense the environment (block 704). The affordance extractor 148 extracts affordances (block 706). For example, the affordance extractor 148 analyzes the data from the sensors 146 to determine affordances including relationships between the robot, an action performed, an object on which this action is performed, and the observed effect. In some examples, the example program 700 includes the affordance extractor 148 and/or the robot 140 in general applying learned perceptual skill (block 705) to extract the affordances (block 706) as disclosed herein.

The model trajectory reader 144 reads the model trajectory (block 708). For example, the model trajectory reader 144 compiles the source code to access the collection of trajectories.

The task planner 150 plans the task to be performed (block 710). In some examples, the task planner 150 combines the affordances and the trajectories and plans execution of a task by planning a series of concrete actions or perception-action trajectories to accomplish the task.

In some examples, the task planner 150 performs a pre-execution safety compliance check (block 712). In some example, before the robot 140 conducts the motions to be produced to effect the trajectories, the task planner 150 simulates the motions in view of the specific data from the sensors 146 and idiosyncrasies of the robot's operating parameters and environmental limitations to ensure safe and successful performance of the task.

If the task planner 150 determines that the execution of the task is safe (block 714), the one or more actuators 152 actuate the action or execute the percept-action trajectory to perform the task (block 716). If the task planner 150 determines that the execution of the task is not safe (block 714), the task planner 150 plans another task (block 710). In some examples, planning another task includes planning an alternative trajectory for the same task—i.e., to accomplish the same goal.

After the action is performed (block 716), the task planner 150 determines if there is another action to perform (block 718). If there is another action to perform, the program 700 continues with the affordance extractor 148 extracting affordances (block 706) in view of the new task. If there is no other action to perform at this time, the robot 140 sits idle until the task planner 150 determines that there is another task to perform (block 718) or the program 700 ends.

Figure 8:
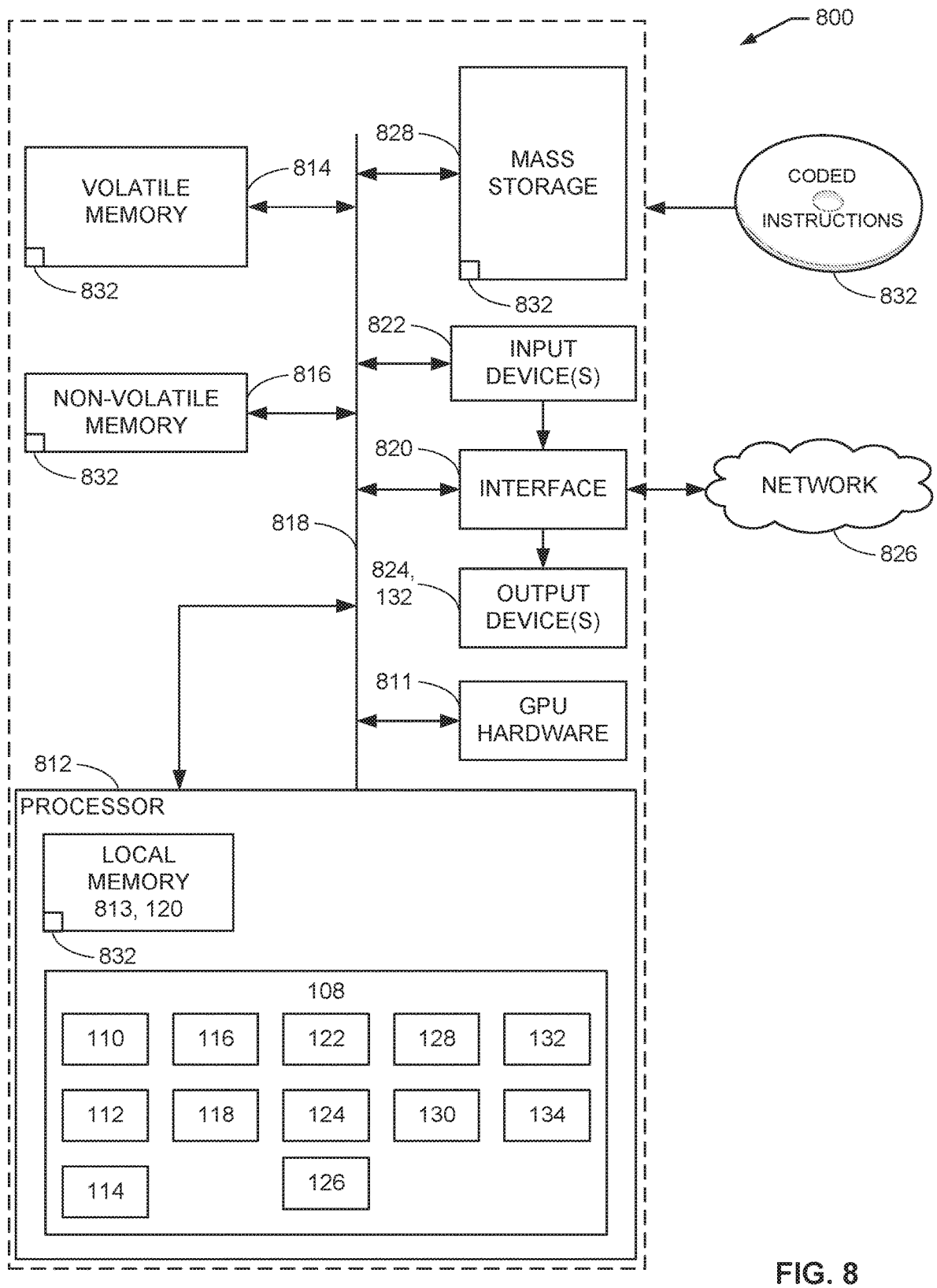
FIG. 8 is a block diagram of an example processing platform structured to execute the instructions of FIG. 6 to implement the example probabilistic generative model simulator of FIG. 1.

FIG. 8 is a block diagram of an example processor platform 800 structured to execute the instructions of FIG. 6 to implement the probabilistic generative model simulator 108 of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs (including GPU hardware 811204), DSPs, or controllers from any desired family or manufacturer. The hardware processor may be a semiconductor based (e.g., silicon based) device. In this example, the processor 812 implements the probabilistic generative model simulator 108, the input receiver 110, the percept mapper 112, the entropy encoder 114, the constraint determiner 116, the trajectory mapper 118, the dimension reducer 122, the probabilistic encoder 124, the assemble network 126, the comparator 128, the modality weight adjuster 130, the output transmitter 132, and the source code generator 134.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 including, for example, the output transmitter 132 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 132, 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 1020 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 6 may be stored in the mass storage device 828, in the volatile memory 814, in the non-volatile memory 816, and/or on a removable non-transitory computer readable storage medium such as a CD or DVD.

Figure 9:
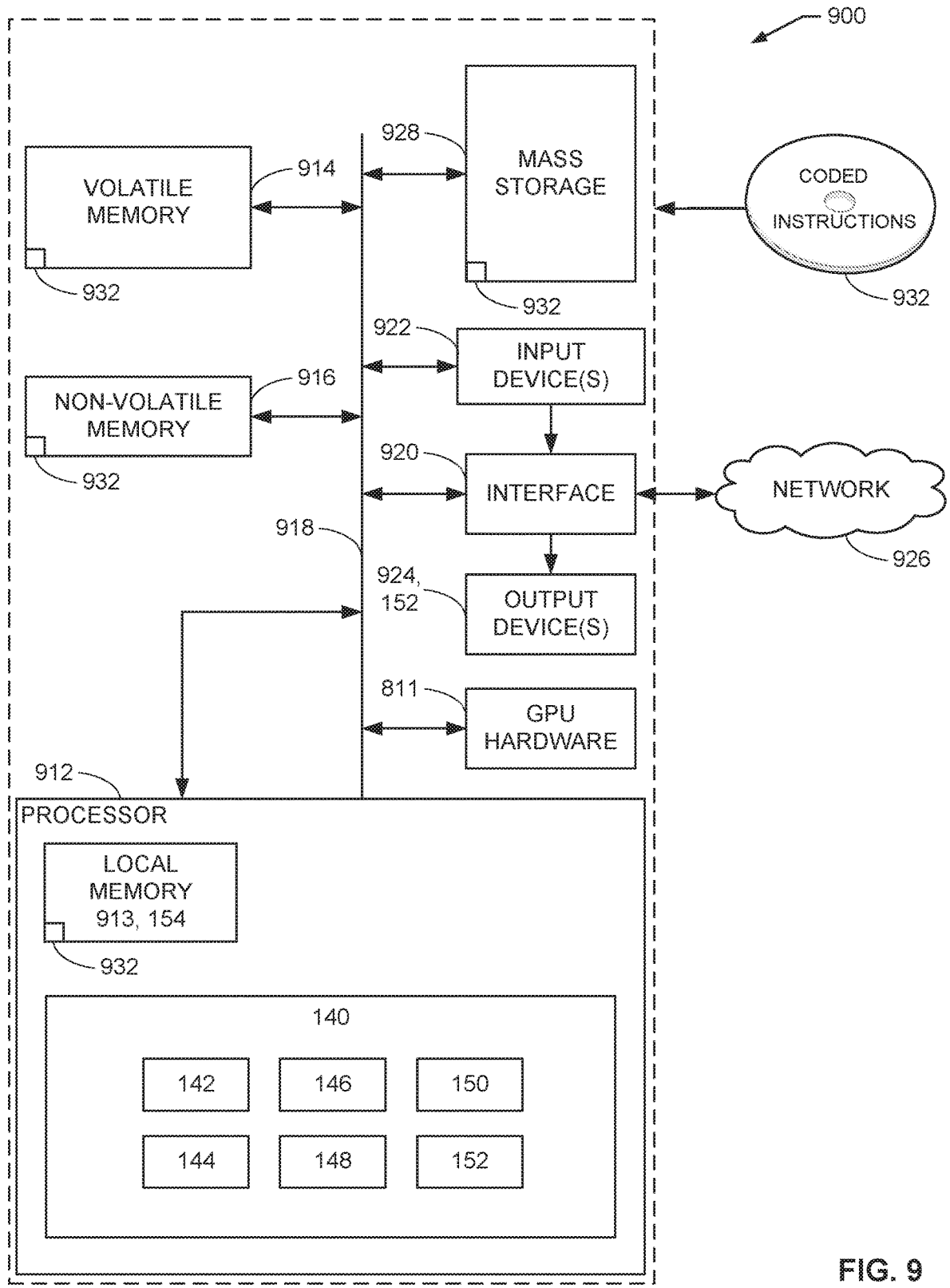
FIG. 9 is a block diagram of an example processing platform structured to execute the instructions of FIG. 7 to implement the example robot of FIG. 1.

FIG. 9 is a block diagram of an example processor platform 900 structured to execute the instructions of FIG. 7 to implement the robot 140 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs (including GPU hardware 204), DSPs, or controllers from any desired family or manufacturer. The hardware processor may be a semiconductor based (e.g., silicon based) device. In this example, the processor 912 implements the robot 140, the source code receiver 142, the model trajectory reader 144, the sensor(s) 146, the affordance extractor 148, the task planner 150, and the actuator(s) 152.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by SDRAM, DRAM, RDRAM®, and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a USB, a Bluetooth® interface, an NFC interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 924 including, for example, the actuator(s) 152 are also connected to the interface circuit 920 of the illustrated example. The output devices 924 can be implemented, for example, by display devices (e.g., an LED, an OLED, an LCD, a CRT display, an IPS display, a touchscreen, etc.), a tactile output device, a printer, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a DSL connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and DVD drives.

The machine executable instructions 932 of FIG. 7 may be stored in the mass storage device 928, in the volatile memory 914, in the non-volatile memory 916, and/or on a removable non-transitory computer readable storage medium such as a CD or DVD.

From the foregoing, it will be appreciated that example systems, apparatus, devices, methods, and articles of manufacture have been disclosed that enable a robot to learn perception-action from a human demonstration. The disclosed systems, apparatus, devices, methods, and articles of manufacture improve the efficiency of using a computing device by enabling computers of any manufacture or model to compile source code to learn embodiment specific perceptual skills without requiring specific programming of that computer device. The disclosed methods, apparatus, systems, and articles of manufacture are accordingly directed to one or more improvement(s) in the functioning of a computer.

The examples disclosed herein introduce the imitation-training methodology for learning perceptual skills specific to different environments and tasks. The imitation-training is concretely established by synaptic-assembles of percept-specific neurons in, for example, the assemble network 126. The examples disclosed herein train and/or build the neuron layers of the assemble network 126 as connections of multiple low-level networks 103, 105, 107 to produce high-level robot perceptual skills. The machine programming technology achieves task-specific learning by probabilistic-simulations. These simulations are grounded on collections of human demonstrations distilled into probabilistic generative models via programing by demonstration techniques.

The examples disclosed herein cope with the complexity and diversity of sensors and different use environments, while producing large amounts of training instances with associated labels and probabilistic ranking from the collected human reference demonstrations (e.g., the collection of perception-action trajectories). Despite of large amount of computations involved in generating such a perceptual skill, the examples disclosed herein are economically and computationally attractive because i) the demonstrations are conducted only once per skill, and ii) the training process happens only once per robot.

Example 1 disclosed herein is an apparatus that includes a percept mapper to identify a first percept and a second percept from data gathered from a demonstration of a task; an entropy encoder to calculate a first saliency of the first percept and a second saliency of the second percept; a trajectory mapper to map a trajectory based on the first percept and the second percept, the first percept skewed based on the first saliency, the second percept skewed based on the second saliency; a probabilistic encoder to determine a plurality of variations of the trajectory and create a collection of trajectories including the trajectory and the variations of the trajectory; and an assemble network to imitate an action based on a first simulated signal from a first neural network of a first modality and a second simulated signal from a second neural network of a second modality, the action representative of a perceptual skill.

Example 2 includes the apparatus of Example 1, further including a comparator to determine a deviation of the action from a mean of the collection of trajectories; and a modality weight adjustor to change a weight of one or more of the first simulated signal or the second simulated signal based on the deviation.

Example 3 includes the apparatus of Example 2, further including a source code generator to create source code for a robot to execute the perceptual skill, the source code including the weight.

Example 4 includes the apparatus of Example 1, wherein the first percept is a contact-less percept.

Example 5 includes the apparatus of Example 4, wherein the second percept is a contact percept.

Example 6 includes the apparatus of Example 1, wherein the variations are random displacements from the trajectory.

Example 7 includes the apparatus of Example 1, wherein the entropy encoder calculates the first saliency based on an identified surface in the first percept.

Example 8 includes the apparatus of Example 1, further including a constraint determiner to identify a constraint in the environment, and the trajectory mapper to map the trajectory based on the constraint.

Example 9 includes an apparatus that includes means for identifying a first percept and a second percept from data gathered from a demonstration of a task; means for calculating a first saliency of the first percept and a second saliency of the second percept; means for mapping a trajectory based on the first percepts and the second percept, the first percept skewed based on the first saliency, the second percept skewed based on the second saliency; means for determining a plurality of variations of the trajectory and create a collection of trajectories including the trajectory and the variations of the trajectory; and means for imitating an action based on a first simulated signal from a first neural network of a first modality and a second simulated signal from a second neural network of a second modality, the action representative of a perceptual skill.

Example 10 includes the apparatus of Example 9, further including means for determining a deviation of the action from a mean of the collection of trajectories; and means for changing a weight of one or more of the first simulated signal or the second simulated signal based on the deviation.

Example 11 includes the apparatus of Example 10, further including means for creating source code for a robot to execute the perceptual skill, the source code including the weight.

Example 12 includes the apparatus of Example 9, wherein the first percept is a contact-less percept.

Example 13 includes the apparatus of Example 12, wherein the second percept is a contact percept.

Example 14 includes the apparatus of Example 9, wherein the variations are random displacements from the trajectory.

Example 15 includes the apparatus of Example 9, wherein the means for calculating saliency is to calculate the first saliency based on an identified surface in the first percept.

Example 16 includes the apparatus of Example 9, further including means for identifying a constraint in the environment, and the means for mapping a trajectory to map the trajectory based on the constraint.

Example 17 includes a non-transitory computer readable medium that includes computer readable instructions that, when executed, cause one or more processors to at least: identify a first percept and a second percept from data gathered from a demonstration of a task; calculate a first saliency of the first percept and a second saliency of the second percept; map a trajectory based on the first percepts and the second percept, the first percept skewed based on the first saliency, the second percept skewed based on the second saliency; determine a plurality of variations of the trajectory and create a collection of trajectories including the trajectory and the variations of the trajectory; and imitate an action based on a first simulated signal from a first neural network of a first modality and a second simulated signal from a second neural network of a second modality, the action representative of a perceptual skill.

Example 18 includes the medium of Example 17, wherein the instructions cause the one or more processors to: determine a deviation of the action from a mean of the collection of trajectories; and change a weight of one or more of the first simulated signal or the second simulated signal based on the deviation.

Example 19 includes the medium of Example 18, wherein the instructions cause the one or more processors to create source code for a robot to execute the perceptual skill, the source code including the weight.

Example 20 includes the medium of Example 17, wherein the first percept is a contact-less percept.

Example 21 includes the medium of Example 20, wherein the second percept is a contact percept.

Example 22 includes the medium of Example 17, wherein the variations are random displacements from the trajectory.

Example 23 includes the medium of Example 17, wherein the instructions cause the one or more processors to calculate the first saliency based on an identified surface in the first percept.

Example 24 includes the medium of Example 17, wherein the instructions cause the one or more processors to: identify a constraint in the environment; and map the trajectory based on the constraint.

Example 25 includes a method that includes identifying, by executing an instruction with a processor, a first percept and a second percept from data gathered from a demonstration of a task; calculating, by executing an instruction with the processor, a first saliency of the first percept and a second saliency of the second percept; mapping, by executing an instruction with the processor, a trajectory based on the first percepts and the second percept, the first percept skewed based on the first saliency, the second percept skewed based on the second saliency; determining, by executing an instruction with the processor, a plurality of variations of the trajectory and creating a collection of trajectories including the trajectory and the variations of the trajectory; and imitating, by executing an instruction with the processor, an action based on a first simulated signal from a first neural network of a first modality and a second simulated signal from a second neural network of a second modality, the action representative of a perceptual skill.

Example 26 includes the method of Example 25, further including determining, by executing an instruction with the processor, a deviation of the action from a mean of the collection of trajectories; and changing, by executing an instruction with the processor, a weight of one or more of the first simulated signal or the second simulated signal based on the deviation.

Example 27 includes the method of Example 26, further including creating, by executing an instruction with the processor, source code for a robot to execute the perceptual skill, the source code including the weight.

Example 28 includes the method of Example 25, wherein the first percept is a contact-less percept.

Example 29 includes the method of Example 28, wherein the second percept is a contact percept.

Example 30 includes the method of Example 25, wherein the variations are random displacements from the trajectory.

Example 31 includes the method of Example 25, wherein the calculating of the first saliency is based on an identified surface in the first percept.

Example 32 includes the method of Example 25, further including identifying, by executing an instruction with the processor, a constraint in the environment; and mapping, by executing an instruction with the processor, the trajectory based on the constraint.

Example 33 includes an apparatus that includes memory including machine reachable instructions; and processor circuitry to execute the instructions to: identify a first percept and a second percept from data gathered from a demonstration of a task; calculate a first saliency of the first percept and a second saliency of the second percept; map a trajectory based on the first percepts and the second percept, the first percept skewed based on the first saliency, the second percept skewed based on the second saliency; determine a plurality of variations of the trajectory and create a collection of trajectories including the trajectory and the variations of the trajectory; and imitate an action based on a first simulated signal from a first neural network of a first modality and a second simulated signal from a second neural network of a second modality, the action representative of a perceptual skill.

Example 34 includes the apparatus of Example 33, wherein the processor circuitry is to execute instructions to: determine a deviation of the action from a mean of the collection of trajectories; and change a weight of one or more of the first simulated signal or the second simulated signal based on the deviation.

Example 35 includes the apparatus of Example 34, wherein the processor circuitry is to execute instructions to create source code for a robot to execute the perceptual skill, the source code including the weight.

Example 36 includes the apparatus of Example 33, wherein the first percept is a contact-less percept.

Example 37 includes the apparatus of Example 36, wherein the second percept is a contact percept.

Example 38 includes the apparatus of Example 33, wherein the variations are random displacements from the trajectory.

Example 39 includes the apparatus of Example 33, wherein the processor circuitry is to execute instructions to calculate the first saliency based on an identified surface in the first percept.

Example 40 includes the apparatus of Example 33, wherein the processor circuitry is to execute instructions to: identify a constraint in the environment; and map the trajectory based on the constraint.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. An apparatus comprising:
   memory;
   instructions; and
   processor circuitry to execute the instructions to:
      identify a first percept and a second percept from data gathered from a demonstration of a task;
      identify a first number of planar surfaces of the first percept and a second number of planar surfaces of the second percept;
      calculate a first unidimensional saliency value of the first percept based on the first number of planar surfaces and a second unidimensional saliency value of the second percept based on the second number of planar surfaces, a higher number of planar surfaces corresponding to a higher saliency value;
      map a trajectory based on the first percept and the second percept, the first percept skewed based on the first unidimensional saliency value, the second percept skewed based on the second unidimensional saliency value;
      determine a plurality of variations of the trajectory and create a collection of trajectories including the trajectory and the variations of the trajectory;
      imitate an action based on a first simulated signal from a first neural network of a first modality and a second simulated signal from a second neural network of a second modality, the action representative of a perceptual skill; and
      create source code for a robot to execute the perceptual skill.

2. The apparatus of claim 1, wherein the processor circuitry is to:
   determine a deviation of the action from a mean of the collection of trajectories; and
   change a weight of one or more of the first simulated signal or the second simulated signal based on the deviation.

3. The apparatus of claim 2, wherein the source code includes the weight.

4. The apparatus of claim 1, wherein the first percept is a contact-less percept.

5. The apparatus of claim 4, wherein the second percept is a contact percept.

6. The apparatus of claim 1, wherein the variations are random displacements from the trajectory.

7. The apparatus of claim 1, wherein the processor circuitry is to:
   identify a constraint in the environment; and
   map the trajectory based on the constraint.

8. The apparatus of claim 1, wherein the processing circuitry is to imitate the action using one of the trajectories in the collection of trajectories.

9. The apparatus of claim 1, wherein the processing circuitry is to create the source code by generating pre-training source code in a pre-training phase and generating release source code after a training phase.

10. The apparatus of claim 9, wherein the processing circuitry is to determine a deviation between the perceptual skill with a probabilistic generative model, training phase is complete when the deviation satisfies a threshold.

11. The apparatus of claim 9, wherein the processing circuitry is to cause transmission of the release source code.

12. A system comprising:
means for identifying a first percept and a second percept from data gathered from a demonstration of a task;
means for identifying a first number of planar surfaces of the first percept and a second number of planar surfaces of the second percept;
means for calculating a first saliency value of the first percept based on the first number of planar surfaces and a second saliency value of the second percept based on the second number of planar surfaces, a higher number of planar surfaces corresponding to a higher saliency value, the first saliency value and the second saliency value representative of an information gain;
means for mapping a trajectory based on the first percepts and the second percept, the first percept skewed based on the first saliency value, the second percept skewed based on the second saliency value;
means for determining a plurality of variations of the trajectory and a collection of trajectories including the trajectory and the variations of the trajectory;
means for imitating an action based on a first simulated signal from a first neural network of a first modality and a second simulated signal from a second neural network of a second modality; and
means for executing a percept-action trajectory to perform the action.

13. The system of claim 12, further including:
means for determining a deviation of the action from a mean of the collection of trajectories; and
means for changing a weight of one or more of the first simulated signal or the second simulated signal based on the deviation.

14. The system of claim 13, further including means for creating source code for the robot to execute the perceptual skill, the source code including the weight.

15. The system of claim 12, wherein the first percept is a contact-less percept.

16. The system of claim 15, wherein the second percept is a contact percept.

17. The system of claim 12, wherein the variations are displacements from the trajectory.

18. The system of claim 12, further including means for identifying a constraint in the environment, and the means for mapping a trajectory is to map the trajectory based on the constraint.

19. A non-transitory computer readable medium comprising computer readable instructions that, when executed, cause one or more processors to at least:
identify a first percept and a second percept from data gathered from a demonstration of a task;
identify a first number of planar surfaces of the first percept and a second number of planar surfaces of the second percept;
calculate a first unidimensional saliency value of the first percept based on the first number of planar surfaces and a second unidimensional saliency value of the second percept based on the second number of planar surfaces, a higher number of planar surfaces corresponding to a higher saliency value;
map a trajectory based on the first percept and the second percept, the first percept skewed based on the first unidimensional saliency value, the second percept skewed based on the second unidimensional saliency value;
determine a collection of trajectories including the trajectory and variations of the trajectory;
imitate an action based on a first simulated signal from a first neural network of a first modality and a second simulated signal from a second neural network of a second modality, the action representative of a perceptual skill; and
create source code for a robot to execute the perceptual skill.

20. The non-transitory computer readable medium of claim 19, wherein the instructions cause the one or more processors to:
determine a deviation of the action from a mean of the collection of trajectories; and
change a weight of one or more of the first simulated signal or the second simulated signal based on the deviation.

21. The non-transitory computer readable medium of claim 20, wherein the source code includes the weight.

22. The non-transitory computer readable medium of claim 19, wherein the first percept is a contact-less percept.

23. The non-transitory computer readable medium of claim 22, wherein the second percept is a contact percept.

24. The non-transitory computer readable medium of claim 19, wherein the variations are random displacements from the trajectory.

25. The non-transitory computer readable medium of claim 19, wherein the instructions cause the one or more processors to:
identify a constraint in the environment; and
map the trajectory based on the constraint.

26. A method comprising:
identifying, by executing an instruction with a processor, a first percept and a second percept from data gathered from a demonstration of a task;
identifying, by executing an instruction with the processor, a first number of planar surfaces of the first percept and a second number of planar surfaces of the second percept;
calculating, by executing an instruction with the processor, a first unidimensional saliency value of the first percept based on the first number of planar surfaces and a second unidimensional saliency value of the second percept based on the second number of planar surfaces, a higher number of planar surfaces corresponding to a higher saliency value;
mapping, by executing an instruction with the processor, a trajectory based on the first percept and the second percept, the first percept skewed based on the first unidimensional saliency value, the second percept skewed based on the second unidimensional saliency value;
determining, by executing an instruction with the processor, a collection of trajectories including the trajectory and variations of the trajectory;
imitating, by executing an instruction with the processor, an action based on a first simulated signal from a first neural network of a first modality and a second simulated signal from a second neural network of a second modality, the action representative of a perceptual skill;
creating, by executing an instruction with the processor, source code for a robot to execute the perceptual skill; and
transmitting the source code to the robot.

27. The method of claim 26, further including:
determining, by executing an instruction with the processor, a deviation of the action from a mean of the collection of trajectories; and changing, by executing an instruction with the processor, a weight of one or more of the first simulated signal or the second simulated signal based on the deviation.

28. The method of claim 26, wherein the variations are displacements from the trajectory.

29. The method of claim 26, further including:
   identifying, by executing an instruction with the processor, a constraint in the environment; and
   mapping, by executing an instruction with the processor, the trajectory based on the constraint.

* * * * *